US009518750B2

(12) United States Patent
Shimizu

(10) Patent No.: US 9,518,750 B2
(45) Date of Patent: Dec. 13, 2016

(54) HUMIDIFICATION DEVICE

(75) Inventor: Akinori Shimizu, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/131,390

(22) PCT Filed: Jun. 26, 2012

(86) PCT No.: PCT/JP2012/066196
§ 371 (c)(1),
(2), (4) Date: Jan. 7, 2014

(87) PCT Pub. No.: WO2013/011808
PCT Pub. Date: Jan. 24, 2013

(65) Prior Publication Data
US 2014/0145355 A1    May 29, 2014

(30) Foreign Application Priority Data

Jul. 15, 2011  (JP) ................................ 2011-156977
Jun. 20, 2012  (JP) ................................ 2012-139013

(51) Int. Cl.
*F24F 6/06*    (2006.01)
*F24F 3/16*    (2006.01)

(52) U.S. Cl.
CPC .......... *F24F 6/06* (2013.01); *F24F 2003/1617* (2013.01); *F24F 2006/065* (2013.01)

(58) Field of Classification Search
CPC . F24F 6/06; F24F 2003/1617; F24F 2006/065
See application file for complete search history.

(56) References Cited

U.S. PATENT DOCUMENTS 1,181,886 A * 5/1916 High .................... F24F 6/06
                                              261/30
1,704,663 A * 3/1929 Noden .................. B01D 47/16
                                              261/92

(Continued)

FOREIGN PATENT DOCUMENTS

CN       2653361 Y  * 11/2004
CN   102679519 A  *  9/2012

(Continued)

OTHER PUBLICATIONS

International Search Report, mailed Oct. 2, 2012, issued in PCT/JP2012/066196.

*Primary Examiner* — Amber R Orlando
*Assistant Examiner* — Stephen Hobson
(74) *Attorney, Agent, or Firm* — Birch, Stewart, Kolasch & Birch, LLP

(57) ABSTRACT

Disclosed is a humidification device capable of satisfying both necessary and sufficient humidification abilities and energy conserving. A humidification filter unit is immersed into water and rotates to facilitate the absorption of water. When the time from stopping of the humidification operation to the restarting thereof is long and the amount of water absorption is insufficient, the humidification filter unit rotates continuously for a predetermined time when the humidification operation restarts, and then rotates intermittently. Meanwhile, when the time from stopping of the humidification operation to the restarting thereof is short and the amount water absorption is sufficient, the humidification filter unit rotates intermittently during the humidification operation. The rotating stop time of the humidification filter unit for each intermittent rotation is set depending on the air blowing quantity of a blower fan.

6 Claims, 14 Drawing Sheets

(56) References Cited

U.S. PATENT DOCUMENTS

| | | | | |
|---|---|---|---|---|
| 1,961,508 A * | 6/1934 | Persons | ................... | F24F 6/06 261/92 |
| 2,253,418 A * | 8/1941 | Crandall | ................... | F24F 6/06 261/24 |
| 2,258,357 A * | 10/1941 | Goodman | ................ | F24F 6/06 239/220 |
| 2,771,247 A * | 11/1956 | Williams | ................... | F24F 3/14 236/44 A |
| 3,212,492 A * | 10/1965 | Himmerich | ............... | F24D 5/00 126/113 |
| 3,266,784 A * | 8/1966 | Saito | ...................... | B01D 53/26 261/138 |
| 3,283,478 A * | 11/1966 | Briggin | ............... | B01F 3/04035 261/29 |
| 3,289,936 A * | 12/1966 | Coburn et al. | ............... | 236/44 R |
| 3,321,196 A * | 5/1967 | Weatherston | ............. | F24F 6/04 236/44 A |
| 3,479,801 A * | 11/1969 | Shohachiro | ........... | A61M 16/16 261/92 |
| 3,733,062 A * | 5/1973 | Bracich | ..................... | F24F 6/06 261/92 |
| 3,886,074 A * | 5/1975 | Prosser | .................. | C02F 3/082 210/150 |
| 4,145,384 A * | 3/1979 | Wagaman | ................. | F24F 6/04 261/106 |
| 4,166,087 A * | 8/1979 | Cline | ....................... | A61L 9/122 239/56 |
| 4,323,191 A * | 4/1982 | Chiyoda | ................ | B60H 3/022 236/44 A |
| 4,926,618 A * | 5/1990 | Ratliff | .................... | B01D 53/06 95/10 |
| 4,969,508 A * | 11/1990 | Tate | ..................... | F24F 11/0009 165/209 |
| 5,108,663 A * | 4/1992 | Chiu | ........................ | F24F 6/043 261/107 |
| 5,894,001 A * | 4/1999 | Hitzler | ................... | A47K 17/00 261/30 |
| 5,944,284 A * | 8/1999 | Bardel | .................. | B64D 11/00 239/329 |
| 6,832,753 B1 * | 12/2004 | Huang | ..................... | F24F 6/06 261/28 |
| 7,690,582 B2 * | 4/2010 | Matsui | .................. | B01D 53/06 236/44 C |
| 2008/0127820 A1 * | 6/2008 | Park | ........................ | A61L 9/122 95/1 |
| 2009/0143879 A1 * | 6/2009 | Amundson | .......... | F24F 11/0086 700/83 |
| 2010/0059601 A1 * | 3/2010 | Bankers | .............. | A01M 1/2077 239/44 |
| 2010/0201007 A1 * | 8/2010 | Tsuda | ....................... | F24F 6/06 261/83 |
| 2010/0258644 A1 * | 10/2010 | Kagawa | .................. | C02F 1/281 236/44 A |
| 2011/0084415 A1 * | 4/2011 | Kim | ......................... | F24F 6/06 261/92 |
| 2012/0297975 A1 * | 11/2012 | Joung | ...................... | F24F 6/06 95/1 |
| 2014/0007872 A1 * | 1/2014 | Grundler | ............ | A61M 13/003 128/203.14 |

FOREIGN PATENT DOCUMENTS

| | | | | |
|---|---|---|---|---|
| CN | 203116237 U | * | 8/2013 | |
| JP | 54-172568 U | | 12/1979 | |
| JP | 4-136641 A | | 5/1992 | |
| JP | 2000-74429 A | | 3/2000 | |
| JP | 2003-302077 A | | 10/2003 | |
| JP | 2005-37076 A | | 2/2005 | |
| JP | 2008-32314 A | | 2/2008 | |
| JP | 2009-24959 A | | 2/2009 | |
| JP | 2011-52875 A | | 3/2011 | |
| JP | 2011-52876 A | | 3/2011 | |
| JP | WO 2014021243 A1 * | 2/2014 | ......... | F24F 11/0015 |

\* cited by examiner

F I G. 1 0
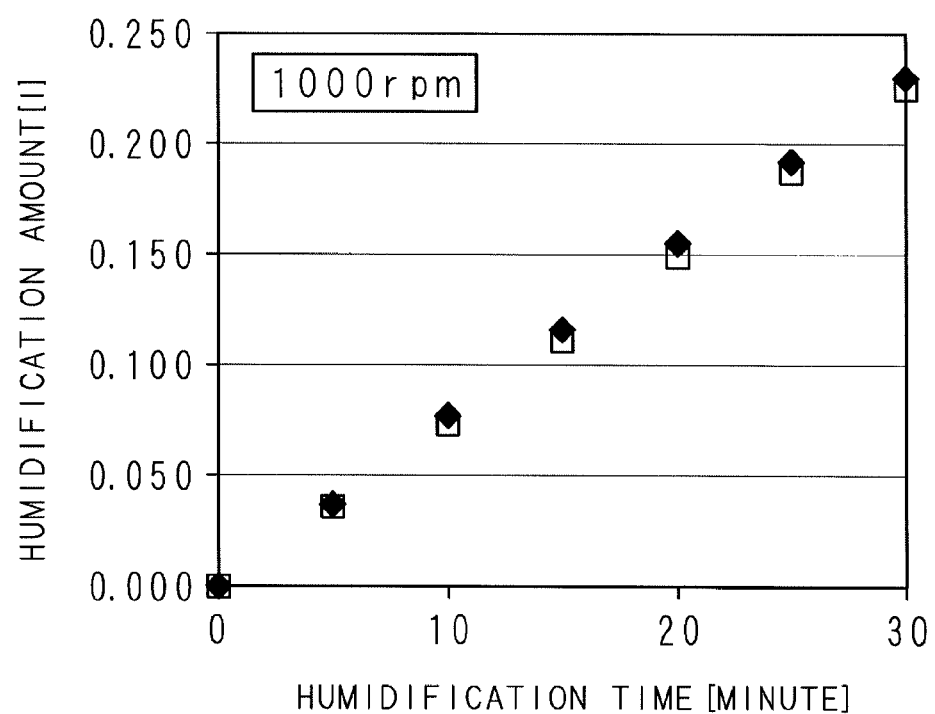

F I G. 1 1
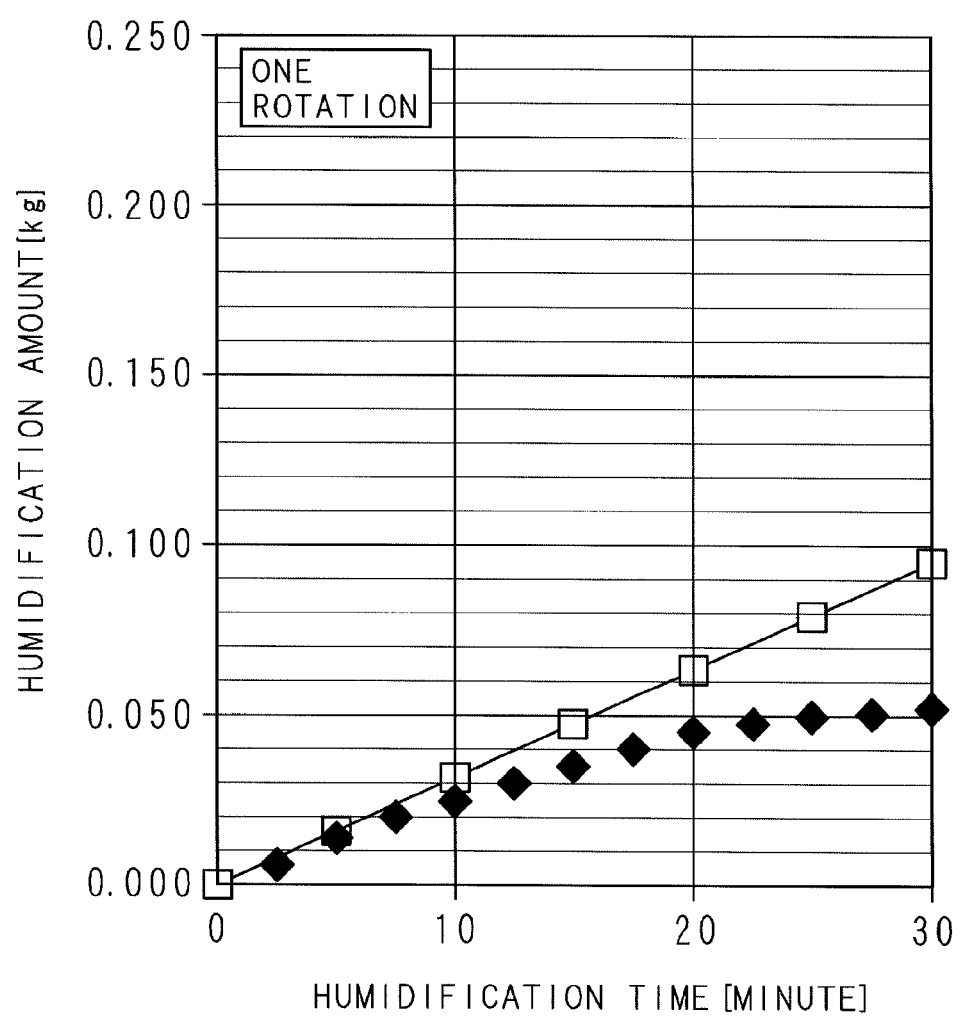

HUMIDIFICATION DEVICE

CROSS-REFERENCE TO RELATED APPLICATIONS

This application is the national phase under 35 U.S.C. §371 of PCT International Application No. PCT/JP2012/66196 which has an International filing date of Jun. 26, 2012 and designated the United States of America.

FIELD

The present invention relates to a vaporization type humidification device which includes a filter unit having water absorption properties and air permeability.

BACKGROUND

A vaporization type humidification device includes a filter unit which is formed in a disk shape, cylindrical shape, or the like and has water absorption properties and air permeability (see Japanese Utility Model Application Laid-Open No. S54-172568, Japanese Patent Application Laid-Open No. 2000-74429, Japanese Patent Application Laid-Open No. 2003-302077, Japanese Patent Application Laid-Open No. 2005-37076, Japanese Patent Application Laid-Open No. 2009-24959, Japanese Patent Application Laid-Open No. 2011-52875, and Japanese Patent Application Laid-Open No. 2008-32314).

The humidification devices disclosed in Japanese Utility Model Application Laid-Open No. S54-172568, Japanese Patent Application Laid-Open No. 2009-24959, and Japanese Patent Application Laid-Open No. 2011-52875 supply water to the filter unit by immersing a portion of a peripheral portion of the disk-shaped filter unit disposed in a vertical attitude into a water tank. In this case, the filter unit absorbs water. The humidification device further includes a blower, whereby when the blower operates, a humidification operation is carried out.

Air outside of a device (for example, an interior with a humidification device installed therein) is sucked during the humidification operation and the air sucked therein passes from one surface of the water absorbing filter unit to the other surface thereof. In this case, the water absorbed into the filter unit is vaporized and then air (that is, humidified air) containing the vaporized water is sent to an outside of the device.

The filter unit is rotatably supported in a circumferential direction so as to allow the whole filter unit to effectively absorb water. The humidification device further includes a rotation driving mechanism for rotating the filter unit.

The filter unit during the humidification operation continuously rotates in a circumferential direction by the operation of the rotation driving mechanism. In this case, a peripheral portion of the filter unit continuously immerses and absorbs water in the circumferential direction, and further sucks water from the peripheral portion to a central portion thereof. From the above result, water is effectively spread uniformly over the whole of the filter unit.

According to the above-described humidification device, the absorption of water into the filter unit is facilitated by the rotation of the filter unit.

Meanwhile, there is a conventional humidification device which uses a water wheel to sprinkle water to the filter unit. A peripheral portion of the water wheel is provided with a plurality of concave portions in parallel and the water wheel rotates by the rotation driving mechanism, so that each concave portion is supplied with water from a water tank and the water stored in each concave portion is sent to the filter unit and is supplied to the interior.

SUMMARY

To appropriately humidify the outside of the device, there is a need to vaporize water just enough from the filter unit. A vaporization amount from the filter unit depends on an amount of water which is absorbed into the filter unit (hereinafter, referred to as an amount of water absorption into the filter unit).

However, the filter unit or the water wheel continuously rotates at a constant speed during the humidification operation. For this reason, the amount of water absorption into the filter unit may be excessive compared to the appropriate amount for vaporization.

In other words, the state in which the amount of water absorption into the filter unit is excessive means the state in which water is supplied to the filter unit more than is necessary or the state in which the absorption of supplied water into the filter unit is facilitated more than is necessary. Therefore, it is preferable to eliminate a waste in terms of energy conserving.

However, the humidification device disclosed in Japanese Patent Application Laid-Open No. 2008-32314 is configured to pump up water by a pump and supply it to the filter unit. In this humidification device, the pump is intermittently operated to control the excessive absorption of water into the filter unit.

In consideration of the above-described circumstances, it is a major object of the present invention to provide a humidification device which has a configuration of intermittently rotating a water storage unit or a filter unit, so that both achievement of necessary and sufficient humidification ability and energy conserving can be satisfied.

The humidification device according to the present invention includes: a water storage unit configured to store water; a filter unit which has water absorption properties and air permeability and is supplied with water from the water storage unit; a blower configured to send air passing through the filter unit to an outside of a device; a rotation driving mechanism configured to rotate the water storage unit or the filter unit to facilitate the supply of water to the filter unit or the absorption of supplied water into the filter unit; and a control unit configured to control an operation of the rotation driving mechanism, wherein the control unit includes an intermittent control means configured to intermittently rotate the water storage unit or the filter unit.

The humidification device according to the present invention is characterized in that, the control unit includes: a continuous control means configured to continuously rotate the water storage unit or the filter unit; and a determination means configured to determine whether or not the water storage unit or the filter unit rotates for a predetermined time or by a predetermined number from the beginning of the continuous rotation, when the water storage unit or the filter unit continuously rotates, wherein when the determination means determines that the water storage unit or the filter unit rotates for the predetermined time or by the predetermined number, the control unit switches a control by the continuous control means to a control by the intermittent control means.

The humidification device according to the present invention further includes a time counting unit configured to count the time taken from stopping of a humidification operation to restarting thereof, wherein when the time counted by the time counting unit is longer than a predetermined time, the control unit starts the control by the continuous control means at the time of restarting the humidification operation, then the control unit carries out the determination using the determination means, and the control unit switches the control by the continuous control means to the control by the intermittent control means when the determination means determines that the water storage unit or the filter unit rotates for the predetermined time or by the predetermined number, and when the time counted by the time counting unit is the predetermined time or less, the control unit starts the control by the intermittent control means at the time of restarting the humidification operation.

The humidification device according to the present invention is characterized in that, the blower is configured to change an air blowing quantity, and the predetermined time or the predetermined number is set depending on the air blowing quantity of the blower.

The humidification device according to the present invention is characterized in that, the blower is configured to change an air blowing quantity, and a rotating stop time of the water storage unit or the filter unit for each intermittent rotation is set depending on the air blowing quantity of the blower.

The humidification device according to the present invention is characterized in that, the rotation time or the rotation number of the water storage unit or the filter unit for each intermittent rotation is constant.

The humidification device according to the present invention is characterized in that, the filter unit is formed in a disk shape, the filter unit includes a filter body having water absorption properties and air permeability and a holding body holding the filter body, the filter unit is disposed in a vertical attitude, and a portion of the filter unit in the circumferential direction thereof is immersed into the water storage unit, the rotation driving mechanism rotates the filter unit in the circumferential direction, and the blower sends air so as to pass the air through the filter unit in a direction intersecting the filter unit.

In the present invention, the humidification device includes a water storage unit, a filter unit, a blower, a rotation driving mechanism, and a control unit, and the control unit has an intermittent control means.

The water storage unit such as a water wheel, a water tank, or the like stores water to be supplied to the filter unit.

The control unit controls an operation of the rotation driving mechanism and the rotation driving mechanism rotates the water storage unit or the filter unit. The supply of water to the filter unit or the absorption of supplied water into the filter unit is facilitated by the rotation of the water storage unit or the filter unit.

The control unit carries out a control by the intermittent control means. In detail, the control unit controls the operation of the rotation driving mechanism to intermittently rotate the water storage unit or the filter unit.

When the water storage unit or the filter unit continuously rotates, a large amount of water is supplied to the filter unit or the absorption of water into the filter is considerably facilitated. Therefore, the amount of water absorption into the filter unit is increased.

Meanwhile, when the water storage unit or the filter unit intermittently rotates, a small amount of water is supplied to the filter unit or the absorption of water into the filter is slightly facilitated. Therefore, the amount of water absorption into the filter unit is decreased.

That is, excessive absorption of water into the filter unit may be controlled by the intermittent rotation of the water storage unit or the filter unit.

Further, the amount of energy consumed by the rotation driving mechanism is smaller in the case in which the water storage unit or the filter unit intermittently rotates than in the case in which the water storage unit or the filter unit continuously rotates.

When an air blowing quantity passing through the filter unit is constant, there is an upper limit value in terms of the appropriate amount of water absorption into the filter unit. In more detail, when the air blowing quantity is constant, an amount of moisture sent from the humidification device to the outside of the device per unit time (hereinafter, referred to as a humidification amount) is increased as the amount of water absorption is increased while the amount of water absorption is the upper limit value or less. However, when the amount of water absorption exceeds the upper limit value, the humidification amount is not increased even when the amount of water absorption is further increased. If the humidification amount is not increased depending on the increase of the amount of water absorption, water is merely supplied to the filter unit more than is necessary. Therefore, when the amount of water absorption into the filter unit exceeds the upper limit value, the intermittent rotation is more useful than the continuous rotation.

In the present invention, the control unit further includes a continuous control means and a determination means.

The control unit carries out a control by the continuous control means. In detail, the control unit controls the operation of the rotation driving mechanism to continuously rotate the water storage unit or the filter unit.

When the control unit carries out a control by the continuous control means, since the water storage unit or the filter unit continuously rotates, the filter unit absorbs a larger amount of water. Therefore, when the amount of water absorption into the filter unit is insufficient, the control by the continuous control means is more preferable than the control by the intermittent control means.

However, when the control by the continuous control means is excessively carried out continuously, the amount of water absorption into the filter unit becomes excessive.

Therefore, the control unit carries out a determination by using the determination means when the water storage unit or the filter unit is continuously rotating. In detail, the control unit determines whether or not the water storage unit or the filter unit rotates for a predetermined time (or a predetermined number of times) from the beginning of the continuous rotation. Herein, the case in which the water storage unit or the filter unit rotates for the predetermined time (or the predetermined number of times) from the beginning of the continuous rotation is the very case in which the filter unit sufficiently absorbs water.

Further, when the determination means determines that the water storage unit or the filter unit rotates for the predetermined time from the beginning of the continuous rotation, the control unit switches the control by the continuous control means into the control by the intermittent control means. As a result, since the filter unit absorbs a small amount of water, the excessive absorption of the water in the filter unit can be controlled.

In the present invention, the humidification device further includes a time counting unit.

The time counting unit counts the time taken from stopping to restarting of the humidification operation (hereinafter, referred to as an operating stop time).

The case in which the time counted by the time counting unit is longer than a predetermined time means the case in which the operating stop time is long. In this case, the amount of water absorption into the filter unit is highly likely to be insufficient at the restarting time of the humidification operation.

The case in which the time counted by the time counting unit is the predetermined time or less means the case in which the operating stop time is short. In this case, the amount of water absorption into the filter unit is highly likely to be sufficient at the restarting time of the humidification operation.

Therefore, when the operating stop time is long, the control unit starts the control by the continuous control means at the restarting time of the humidification operation and then the determination means carries out the determination, and when the determination means determines that the water storage unit or the filter unit rotates for the predetermined time from the beginning of the continuous rotation, the control unit switches the control by the continuous control means to the control by the intermittent control means.

As a result, the filter unit insufficiently absorbing water at the restarting time of the humidification operation absorbs a large amount of water after restarting of the humidification operation, while once the filter unit sufficiently absorbs water, then begins to absorb a small amount of water.

Meanwhile, when the operating stop time is short, the control unit starts the control by the intermittent control means at the restarting time of the humidification operation.

As a result, the filter unit sufficiently absorbing water at the restarting time of the humidification operation absorbs a small amount of water after restarting of the humidification operation.

According to the above-described humidification device, both the insufficient absorption of water and the excessive absorption of water into the filter unit can be controlled.

In the present invention, the predetermined time or the predetermined number of times associated with the determination means is set on the basis of the air blowing quantity of the blower.

For example, when the outside of the device is considerably or suddenly humidified, the humidification device increases the air blowing quantity of the blower so as to increase the vaporization amount from the filter unit. In this case, the amount of water absorption into the filter unit needs to be large. The reason is that when the amount of water absorption is much smaller than the required vaporization amount, the outside of the device may be insufficiently humidified.

Meanwhile, when the outside of the device requires only slight humidification, the humidification device decreases the air blowing quantity of the blower so as to decrease the vaporization amount from the filter unit. In this case, the amount of water absorption into the filter unit needs to be small. The reason is that the amount of water absorption much larger than the required vaporization amount is wasteful.

However, when the predetermined time associated with the determination means is long or the predetermined number of times associated with the determination means is large, the amount of water absorption into the filter unit is large and when the predetermined time is short or the predetermined number of times is small, the amount of water absorption into the filter unit is small.

Therefore, the predetermined time or the predetermined number of times is appropriately set on the basis of the air blowing quantity of the blower, such that the filter unit may not only absorb an appropriate amount of water, but also vaporize an appropriate amount of water from the filter unit. As a result, the humidification device can achieve sufficient humidification ability.

In the present invention, the rotating stop time of the water storage unit or the filter unit for each intermittent rotation, that is, the stop time from the temporary stop of the rotation after the water storage unit or the filter unit rotates to the restarting of the next rotation is set on the basis of the air blowing quantity of the blower.

When the air blowing quantity of the blower is large (or small), there is a need to increase (or decrease) the amount of water absorption into the filter unit for just enough humidification.

When the rotating stop time is short, the amount of water absorption into the filter unit is large and when the rotating stop time is long, the amount of water absorption into the filter unit is small.

Therefore, the rotating stop time is appropriately set on the basis of the air blowing quantity of the blower, such that the filter unit may not only absorb an appropriate amount of water, but also vaporize an appropriate amount of water from the filter unit. As a result, the humidification device can achieve sufficient humidification ability.

In the present invention, the rotation time (or rotation number) of the water storage unit or the filter unit for each intermittent rotation, that is, the rotation time (or rotation number) until the temporary stop of the rotation after rotation of the water storage unit or the filter unit is restarted is constant. The reason is that the humidification device controls the amount of water absorption into the filter unit based on the length of the rotating stop time. Further, it is difficult to control the amount of water absorption into the filter unit based on the balance between the rotation time or the rotation number and the rotating stop time.

That is, even though the rotating stop time is changed based on the air blowing quantity of the blower, the humidification device can control the amount of water absorption into the filter unit by a simple method without changing the rotation time or the rotation number.

In the present invention, the disk-shaped filter unit is disposed in the vertical attitude and a portion of the filter unit in the circumferential direction thereof may be immersed into the water storage unit. The filter unit is immersed into the water storage unit, such that the water may be supplied from the water storage unit to the filter unit.

In addition, the rotation driving mechanism rotates the vertically disposed filter unit in the circumferential direction.

Further, a direction in which the air sent from the blower passes through the filter unit is a direction intersecting the filter unit. That is, the air passes from one surface of the filter unit to the other surface thereof.

The filter unit absorbs water during the immersing of a portion of the filter unit in the circumferential direction thereof and the water is sucked up from the portion into which the filter unit is immersed to the portion into which the filter unit is not immersed. When water is absorbed into the whole of the filter unit in the circumferential direction thereof by rotating the filter unit in the circumferential direction, the water is widely spread to the whole of the filter unit. That is, water is efficiently absorbed into the whole of the filter unit. As a result, the air passing through the filter unit absorbing water has sufficient moisture and the air containing the sufficient moisture is sent to the outside of the device.

According to the above-described humidification device, when the filter unit is immersed and thus the filter body is immersed, the absorption of water into the filter unit is carried out even when the rotation of the filter unit stops. Therefore, there is no possibility of causing the filter unit to insufficiently absorb water due to the intermittent rotation.

Further, since it is not necessary to rotate the water storage unit, there is no possibility of flowing out the water stored in the water storage unit to the outside of the water storage unit due to vibration, impact, or the like during the water storage unit rotation.

According to the humidification device of the present invention, it is possible to suppress water being supplied to the filter unit more than is necessary or absorption of supplied water into the filter unit being facilitated more than is necessary by the intermittent rotation of the water storage unit or the filter unit. For this reason, the excessive absorption of the water in the filter unit can be controlled. That is, it is possible to absorb an appropriate amount of water into the filter unit.

Therefore, since the water from the filter unit is vaporized just enough, it is possible to appropriately humidify the outside of the device. That is, the necessary and sufficient humidification ability can be achieved by the humidification device. Further, more energy can be conserved with the filter unit than when it is rotated at all times.

The above and further objects and features will more fully be apparent from the following detailed description with accompanying drawings.

BRIEF DESCRIPTION OF THE DRAWINGS

FIG. 10 is a characteristic diagram illustrating the relationship between the humidification time and the humidification amount based on a humidification operation (1000 rpm) of the humidification device according to embodiment 1 of the present invention.

FIG. 11 is a characteristic diagram illustrating the relationship between the humidification time and the humidification amount based on a humidification operation (continuous one rotation) of the humidification device according to embodiment 1 of the present invention.

DETAILED DESCRIPTION

Hereinafter, the present invention will be described in detail with reference to the drawings illustrating embodiments thereof.

Embodiment 1

Figure 1:
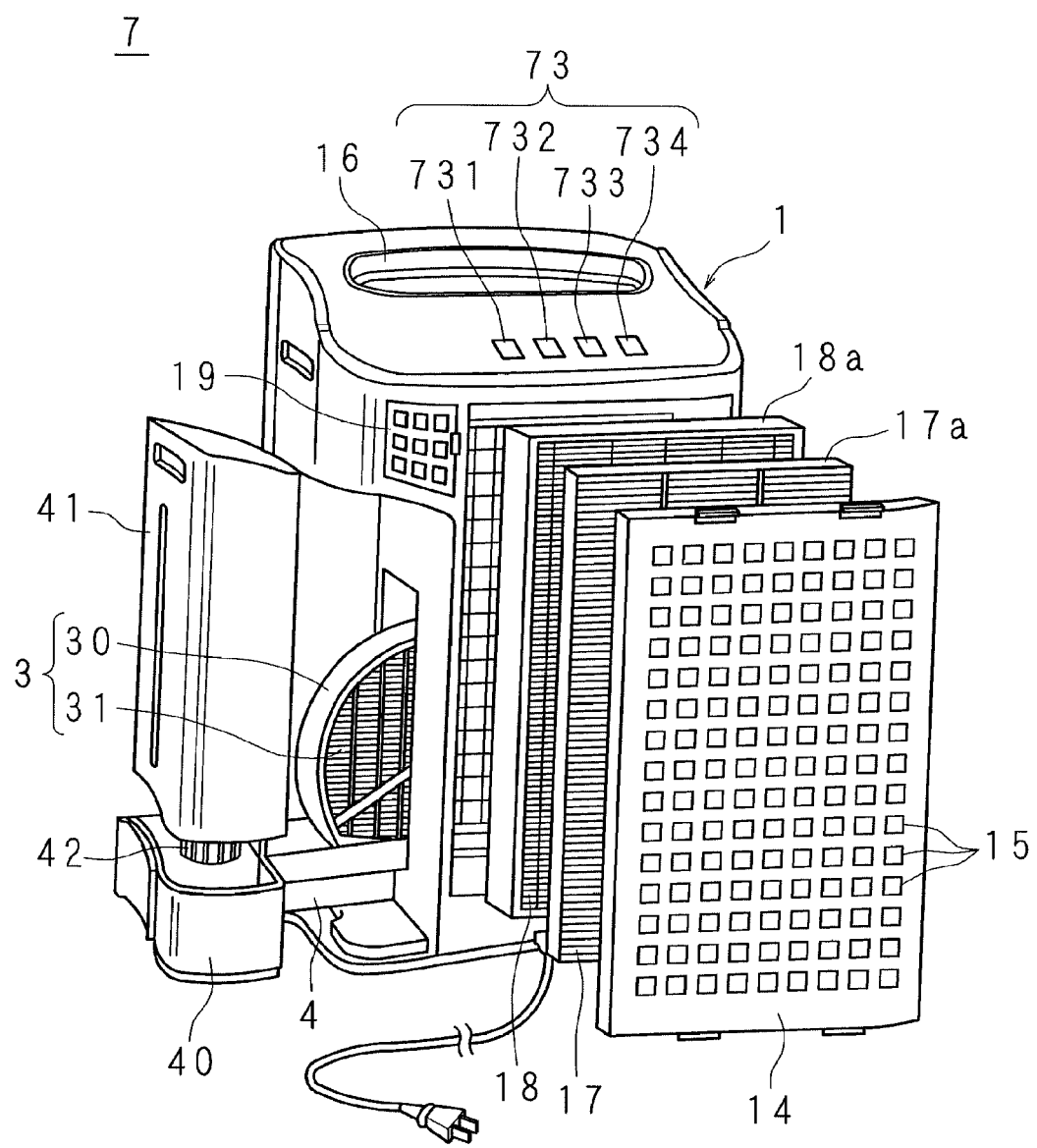
FIG. 1 is a perspective view illustrating an outer appearance of a humidification device according to embodiment 1 of the present invention.
Figure 2:
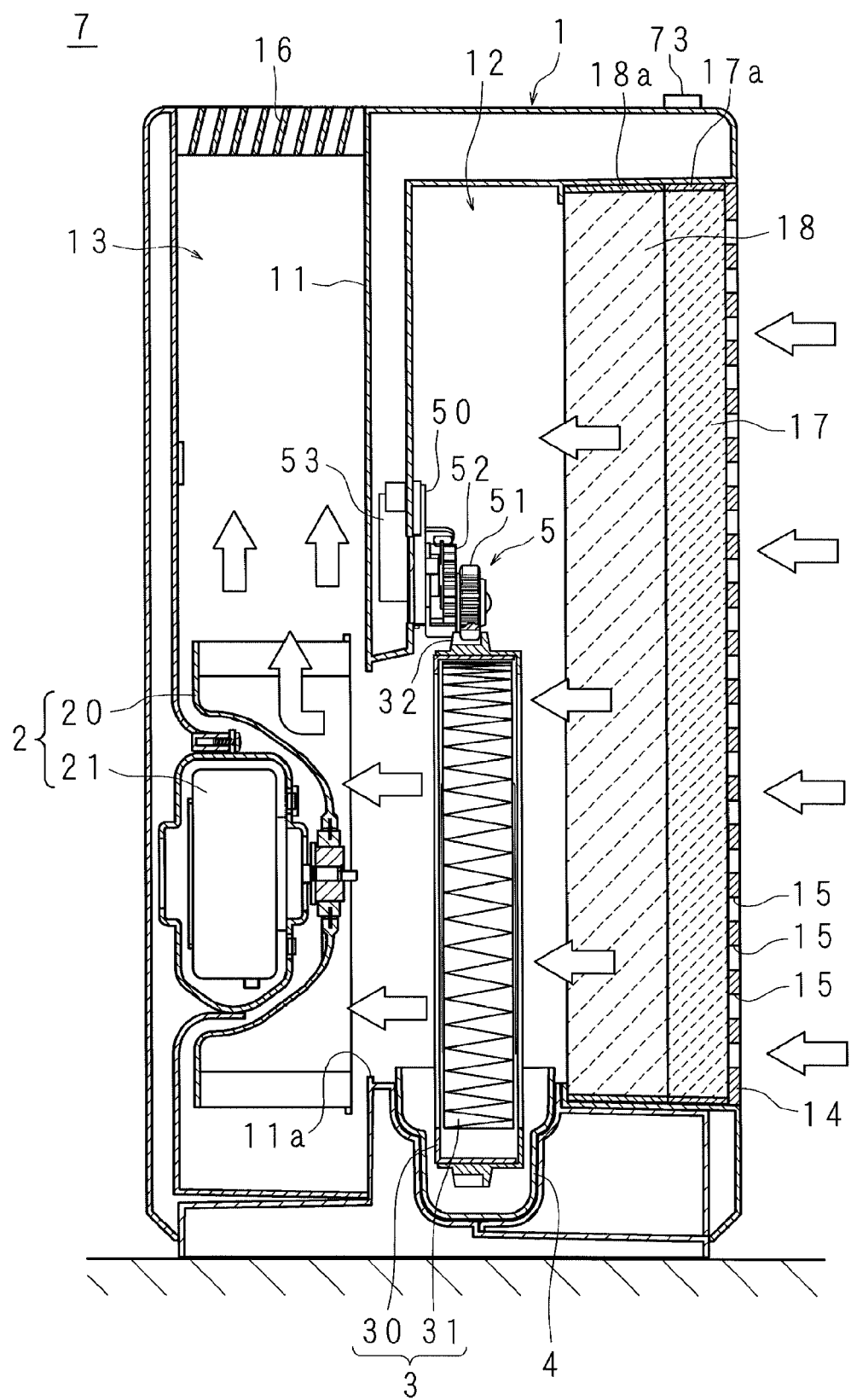
FIG. 2 is a cross-sectional view illustrating a schematic configuration of the humidification device according to embodiment 1 of the present invention.

FIG. 1 is a perspective view illustrating an outer appearance of a humidification device 7 according to embodiment 1 of the present invention and FIG. 2 is a cross-sectional view illustrating a schematic configuration of the humidification device 7. Left and right sides of FIG. 2 are front and rear sides of the humidification device 7 and FIG. 1 is a perspective view as seen from the right side (that is, the rear side of the humidification device 7) of FIG. 2. Hereinafter, the front face side of the humidification device 7 is referred to as a front side and the rear face side thereof is referred to as a rear side.

Figure 3:
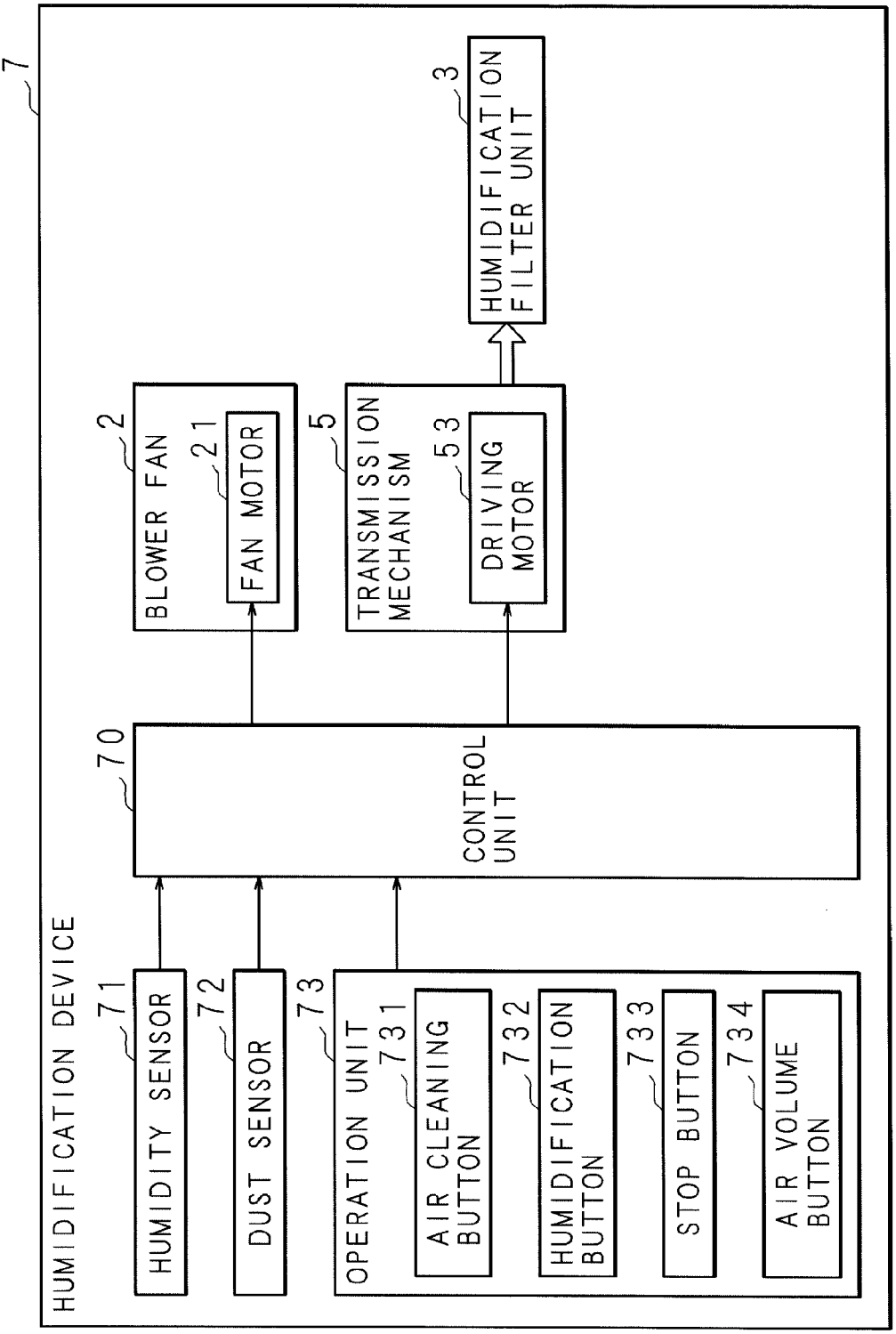
FIG. 3 is a block diagram illustrating a configuration of a control system of the humidification device according to embodiment 1 of the present invention.

FIG. 3 is a block diagram illustrating a configuration of a control system of the humidification device 7.

The humidification device 7 according to the present embodiment has humidification ability and air cleaning ability. The humidification device 7 has a humidification operation mode in which both of the humidification ability and the air cleaning ability are achieved and a cleaning operation mode in which only the air cleaning ability is achieved.

The humidification device 7 includes a housing 1 having a rectangular box shape illustrated in FIGS. 1 and 2, a blower fan 2 illustrated in FIGS. 2 and 3, a humidification filter unit 3 illustrated in FIGS. 1 to 3, a water reception tray 4 illustrated in FIGS. 1 and 2, a transmission mechanism 5 illustrated in FIGS. 2 and 3, and a control unit 70, a humidity sensor 71, and a dust sensor 72 illustrated in FIG. 3, which are provided in the housing 1. Further, the humidification device 7 includes an operation unit 73 which is mounted on an upper portion of the housing 1 as illustrated in FIGS. 1 to 3.

As illustrated in FIG. 1, a sensor cover 19 is attachably and detachably installed in the housing 1. The sensor cover 19 has lattice-shaped apertures formed on a central portion thereof, and an outside of the device and a sensor chamber (not illustrated) formed in the housing 1 are communicated with each other through the lattice-shaped apertures. The humidity sensor 71 and the dust sensor 72 are arranged in the sensor chamber.

The control unit 70 is a control center of the humidification device 7.

The humidity sensor 71 detects a humidity at outside of the device and outputs the detected result (hereinafter, referred to as a detection humidity) to the control unit 70. When the humidity detected by the humidity sensor 71 exceeds a predetermined humidity (for example, 60%), the humidity at outside of the device is sufficiently high, thereby it is not necessary to carry out humidification. Meanwhile, when the humidity detected by the humidity sensor 71 is the predetermined humidity or less, the humidity at outside of the device is low, thereby it is necessary to carry out humidification. Unless specifically described, the case in which the humidity detected by the humidity sensor 71 is the predetermined humidity or less will be described below.

When a content of particles, such as dust, smoke, or the like, included in air at outside of the device is large, a pollution level of air is high. Meanwhile, when the content of particles included in air at outside of the device is small, the pollution level of air is low. Therefore, the dust sensor 72 detects the pollution of air at outside of the device by detecting the content of particles contained in the air at outside of the device and outputs the detected result (hereinafter, referred to as a pollution level of detection) to the control unit 70.

As illustrated in FIGS. 1 and 3, the operation unit 73 includes an air cleaning button 731, a humidification button 732, a stop button 733, and an air volume button 734 which are operated by a user of the humidification device 7. The buttons 731 to 734 are disposed on an outer surface of a top plate of the housing 1.

In the state in which the humidification device 7 stops, when the air cleaning button 731 (or the humidification button 732) is operated, the humidification device 7 starts an operation in the cleaning operation mode (or the humidification operation mode). Further, when the air cleaning button 731 (or the humidification button 732) is operated during the operation in the humidification operation mode (or the cleaning operation mode), the humidification device 7 switches the operation from the humidification operation mode to the cleaning operation mode (or from the cleaning operation mode to the humidification operation mode). When the stop button 733 is operated during the operation, even though the humidification device 7 is operated in any one of the humidification operation mode and the cleaning operation mode, the operation of the humidification device 7 stops.

When the operation in the cleaning operation mode is started, the control unit 70 starts the driving of a fan motor 21 to be described below and when the operation in the cleaning operation mode is ended, the control unit ends the driving of the fan motor 21. When the operation in the humidification operation mode is started, the control unit 70 starts the driving of both of the fan motor 21 and a driving motor 53 to be described below and when the operation in the humidification operation mode is ended, the control unit 70 ends the driving of both of the fan motor 21 and the driving motor 53. When the operation is switched from the humidification operation mode to the cleaning operation mode (or from the cleaning operation mode to the humidification operation mode), the control unit 70 ends (or starts) the driving of the driving motor 53.

Further, the control unit 70 counts an elapsed time (hereinafter, referred to as a non-humidification time) from the stop of the operation in the humidification operation mode to the restarting of the operation in the humidification operation mode. For this, the control unit 70 starts the counting when the stop button 733 is operated during the operation in the humidification operation mode and then ends the counting when the humidification button 732 is operated. Even though the stop button 733 is operated and then the air cleaning button 731 is operated, the counting of the non-humidification time is continued. Such a control unit 70 serves as the time counting unit according to the embodiment of the present invention. The counting of the elapsed time by the control unit 70 is carried out, for example, by counting the number of clocks which is allocated to the control unit 70. Further, the humidification device 7 includes a timer which serves as the time counting unit and may be configured to input the result counted by the timer to the control unit 70.

A rear panel 14 of the housing 1 illustrated in FIGS. 1 and 2 is attachably and detachably mounted in a rear opening of the housing 1 and a front side of the rear panel 14 is stacked with a deodorizing filter 17 and a dust collection filter 18.

The deodorizing filter 17 is made, for example, by dispersing and holding an activated charcoal on a non-woven fabric and has a role of adsorbing and removing an odorous component in the air passing through the deodorizing filter 17. The dust collection filter 18 is, for example, a known high efficiency particulate air (HEPA) filter and has a role of collecting and removing a fine dust contained in the air passing through the dust collection filter 18. The deodorizing filter 17 and the dust collection filter 18 are integrally formed in each of the rectangular frame bodies 17a and 18a made of synthetic resin and are fitted in a filter chamber disposed on the front side of the rear panel 14 in the housing 1.

As illustrated in FIG. 2, the inside of the housing 1 is divided into a suction chamber 12 on the rear side thereof and a discharge chamber 13 on the front side thereof by a partition 11. The suction chamber 12 communicates with the outside of the device through a plurality of inlets 15, 15, . . . (see FIGS. 1 and 2) which are penetrated through the rear panel 14. The discharge chamber 13 communicates with the outside of the device through an outlet 16 (see FIGS. 1 and 2) which is penetrated through an upper plate of the housing 1. The suction chamber 12 and the discharge chamber 13 communicate with each other through an opening 11a which is formed on a lower portion of the partition 11.

The blower fan 2 includes an impeller 20 and an electric fan motor 21 (see FIGS. 2 and 3) which drives the impeller 20. The fan motor 21 is fixed to the outside of the discharge chamber 13. The impeller 20 is fixed to an output end of the fan motor 21 protruding inwardly in the discharge chamber 13 and is disposed at the lower portion of the partition 11 facing the opening 11a. Further, the impeller 20 rotates by the driving of the fan motor 21.

When the impeller 20 rotates, as illustrated by an outline arrow in FIG. 2, air is introduced into the suction chamber 12 via the inlets 15, 15, . . . of the rear panel 14 and flows in the suction chamber 12 forward and is sucked into the impeller 20 via the opening 11a of the lower portion of the partition 11. Next, a flow direction of air is changed upwardly, such that air is derived into the discharge chamber 13 and is sent to the outside of the device via the outlet 16 of the upper portion of the discharge chamber 13. In brief, a blowing path in the humidification device 7 is formed by the inlets 15, 15, . . . , the suction chamber 12, the opening 11a, the discharge chamber 13, and the outlet 16, which are communicated with each other.

As illustrated in FIGS. 1 and 2, the deodorizing filter 17 and the dust collection filter 18 are disposed on an upstream side of the blowing path. Therefore, the air introduced into the suction chamber 12 via the inlets 15, 15, . . . passes through the deodorizing filter 17 and thus the odorous component of the air is removed, such that the air becomes a clean air from which dust is removed by passing through the dust collection filter 18. In brief, the humidification device 7 includes the deodorizing filter 17 and the dust collection filter 18 to have the air cleaning ability.

The humidification filter unit 3 and the water reception tray 4 are disposed between the dust collection filter 18 and the blower fan 2 so as to humidify air immediately after the air is purified by the deodorizing filter 17 and the dust collection filter 18.

The water reception tray 4 is placed on an inner surface of the lower plate of the housing 1 and is disposed in the suction chamber 12 on the front side of the dust collection filter 18. The water reception tray 4 may be taken out to the outside of the device from one side of the housing 1 along with the humidification filter unit 3 which is supported above the water reception tray 4 as described below. As illustrated in FIG. 1, a tank bracket 40 of a wide width is continuously mounted on an end of a drawing side of the water reception tray 4 and a water tank 41 is attachably and detachably mounted on the tank bracket 40.

The water tank 41 is a rectangular vessel having a water tap 42 at a longitudinal end and is mounted on the tank bracket 40 (see FIGS. 4 and 5 to be described below) in an attitude in which the water tap 42 is downwardly directed. The water tap 42 has a known water level regulating valve. The water level regulating valve is in an open state by being pushed up to a push-up protrusion 43 (see FIG. 4 to be described below) erected at a corresponding position of the tank bracket 40 when the water tank 41 is mounted on the tank bracket 40 and sends the water received in the water tank 41 to the water reception tray 4 to serve to store water of a constant water level L (see FIG. 5 to be described below) in the water reception tray 4.

As illustrated in FIGS. 1 and 2, the humidification filter unit 3 includes a holding frame 30 which is formed in a hollow disk shape and a humidification filter 31 which is housed and held in the holding frame 30. In the humidification filter 31, sheets made of a material (for example, non-woven fabric) having water absorption properties and air permeability overlap each other in a bellows shape. Therefore, a contact area between the humidification filter 31 and air passing through the humidification filter 31 is large, compared to sheets which do not overlap each other.

Figure 4:
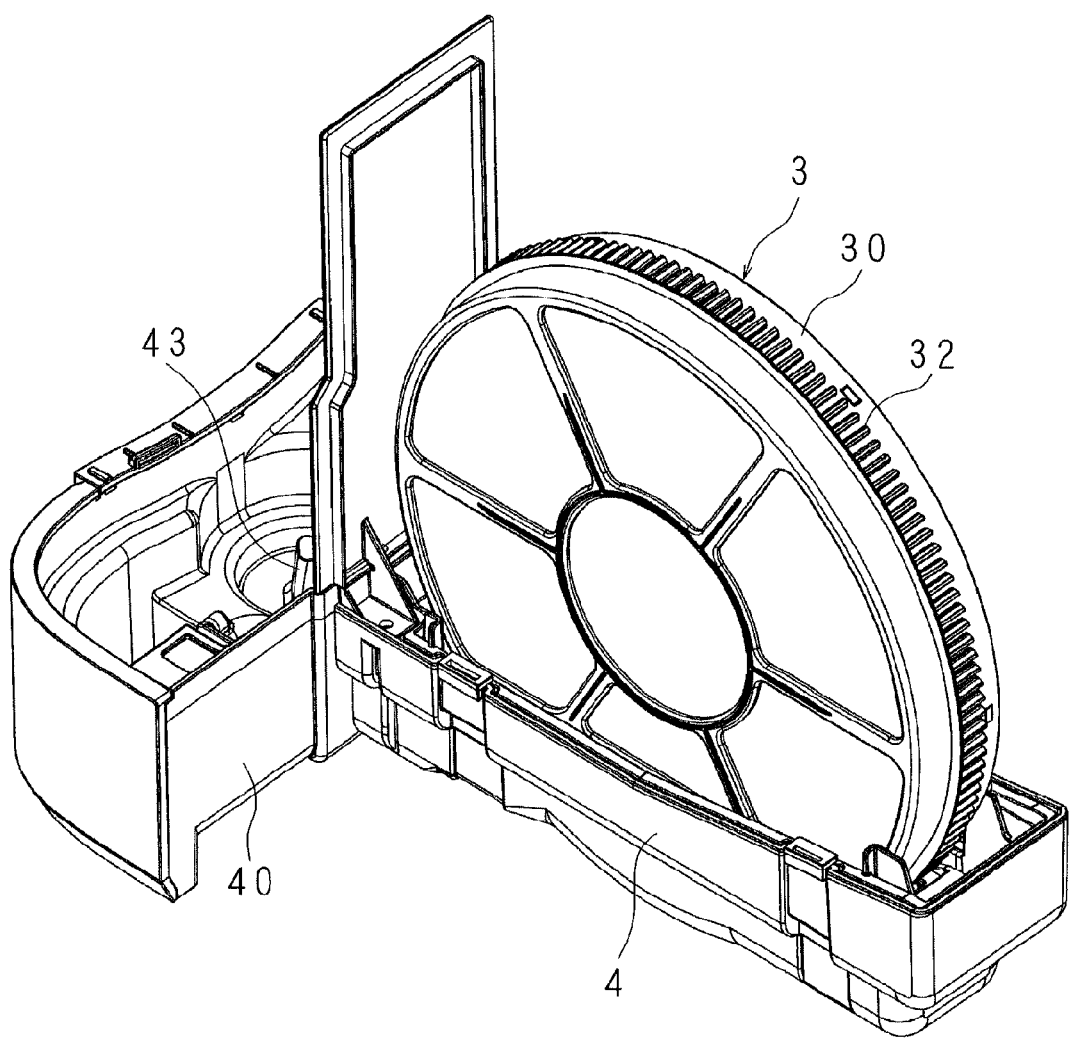
FIG. 4 is a perspective view illustrating a support structure which supports a humidification filter unit included in the humidification device according to embodiment 1 of the present invention.
Figure 5:
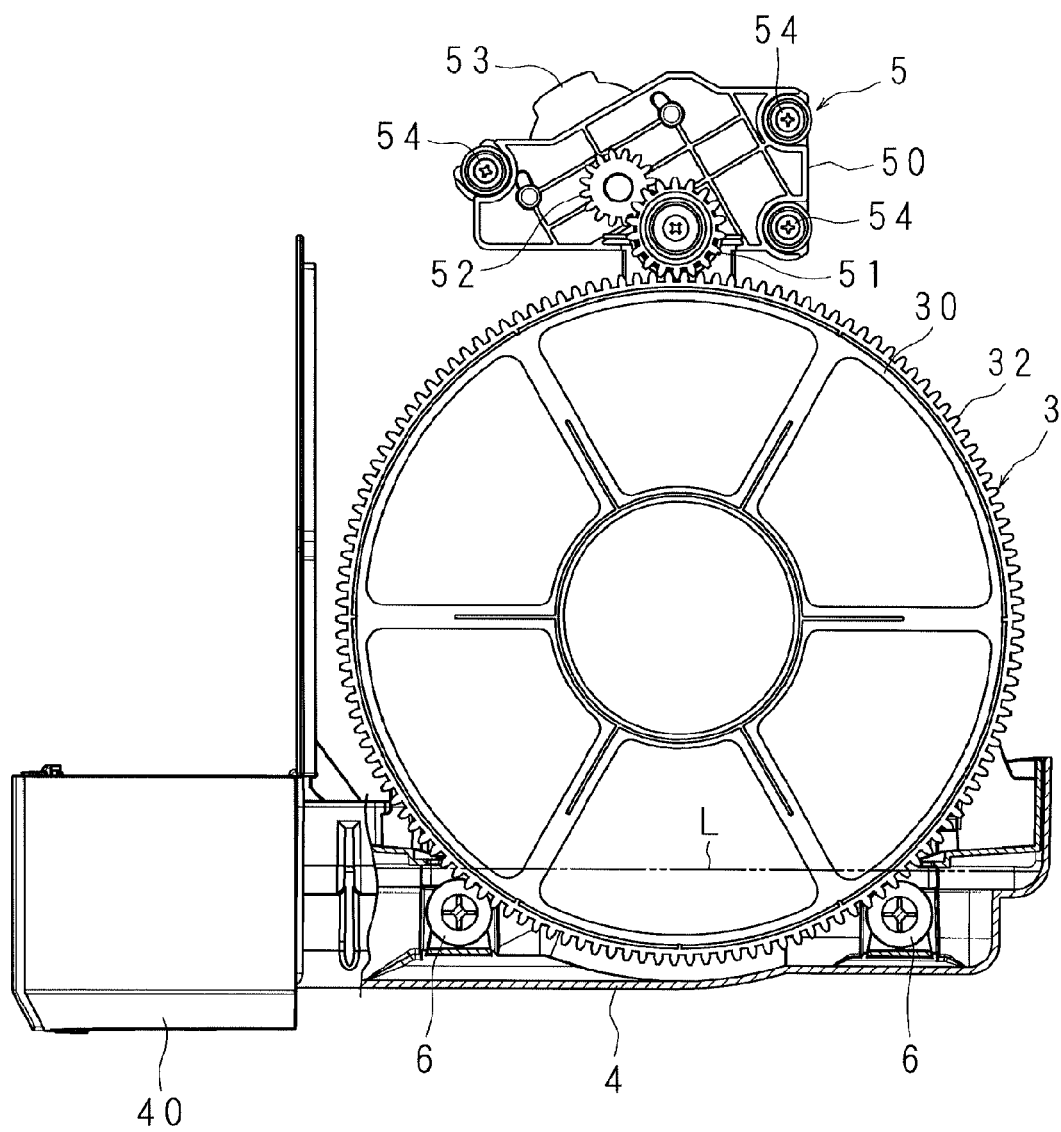
FIG. 5 is a partially cutaway front view illustrating the support structure which supports the humidification filter unit included in the humidification device according to embodiment 1 of the present invention.

FIGS. 4 and 5 are a perspective view and a partially cutaway front view illustrating a support structure which supports the humidification filter unit 3. FIG. 5 is a partially cutaway view of the water reception tray 4. In the FIGS. 4 and 5, only the holding frame 30 of the humidification filter unit 3 is illustrated, while the humidification filter 31 is omitted.

As illustrated in FIG. 5, the lower portion of the humidification filter unit 3 is inserted into the water reception tray 4 and is placed on two support rollers 6 and 6 which are mounted in the water reception tray 4. As a result, the humidification filter unit 3 is supported above the water reception tray 4 in a vertical attitude. The support rollers 6 and 6 are distributedly disposed on both sides in a longitudinal direction on a bottom surface of the water reception tray 4 and rotationally contact a lower outer peripheral surface of the holding frame 30 at each position.

As illustrated in FIG. 1, the supported humidification filter unit 3 may be taken out to the outside of the device from one side of the housing 1 along with the water reception tray 4. Next, the humidification filter unit 3 may be easily separated from the water reception tray 4 by being lifted up. Reversely, the humidification filter unit 3 may be easily supported in a vertical attitude by being placed on the support rollers 6 and 6 in the water reception tray 4. Further, the humidification filter unit 3 is pushed into the housing 1 along with the water reception tray 4 from this state, such that the humidification filter unit 3 may be set at a predetermined position in the housing 1. The attachment and detachment of the humidification filter unit 3 is carried out to perform the repair and replacement of the humidification filter 31, the cleaning of the water reception tray 4 or the like.

As illustrated in FIGS. 2, 4, and 5, the holding frame 30 includes a ring gear portion 32 which is integrally formed on an outer peripheral surface thereof with an appropriate width and has teeth formed over the entire outer peripheral of the central portion thereof in a width direction. As illustrated in FIGS. 2 and 5, the ring gear portion 32 is threadedly engaged with a transmission gear 51 of the transmission mechanism 5 which is disposed above the holding frame 30.

The transmission mechanism 5 includes the transmission gear 51 and a driving gear 52 which are mounted on one surface of a base 50 and a driving motor 53 which is mounted on the other surface of the base 50, and is fixed to an appropriate portion of the partition 11 in the housing 1 by a plurality of fixing screws 54, 54, . . . which penetrate through the base 50. The driving gear 52 is fitted on an output shaft of the driving motor 53 and the rotation of the driving motor 53 is transferred to the transmission gear 51 through the driving gear 52, such that the transmission gear 51 may rotate.

The engagement of the transmission gear 51 of the transmission mechanism 5 with the ring gear portion 32 of the holding frame 30 is made in the state in which the humidification filter unit 3 is set at a predetermined position in the housing 1. The humidification filter unit 3 includes three points supported at each position of the support rollers 6 and 6 and the transmission gear 51, that is, other positions in the circumferential direction by the engagement of the transmission gear 51 with the ring gear portion 32. Therefore, the humidification filter unit 3 need not include a support shaft which is rotatably supported at the central portion thereof. Therefore, as illustrated in FIGS. 4 and 5, the front and rear surfaces of the holding frame 30 are provided with openings which are formed over substantially the whole surface except at least a support portion for supporting the humidification filter 31 in the humidification filter unit 3. As a result, a large amount of air passes through the humidification filter 31 without being hindered by the holding frame 30. That is, it is possible to improve the humidification performance.

When the driving motor 53 illustrated in FIGS. 2, 3, and 5 is driven, the rotation of the driving gear 52 is transferred to the holding frame 30 through the transmission gear 51 and the ring gear portion 32. In this case, the humidification filter unit 3 rotates around the center of the holding frame 30 (that is, in the circumferential direction of the humidification filter unit 3).

In this regard, the driving motor 53 uses an AC motor. Therefore, when a feeding frequency to the driving motor 53 is different, the rotation number of the driving motor 53 and the rotation number of the humidification filter unit 3 are different. When the feeding frequency is 50 Hz (or 60 Hz), the humidification filter unit 3 rotates once per about 85 seconds (or about 70 seconds).

As described above, water is stored inside of the water reception tray 4 at a constant water level L and the lower portion of the holding frame 30 is dipped into the water stored in the water reception tray 4. As illustrated in FIGS. 2, 4, and 5, the holding frame 30 has openings formed on both surfaces thereof, therefore the lower portion of the peripheral portion of the humidification filter 31 is immersed. That is, a portion of the humidification filter unit 3 in the circumferential direction is immersed, and thus water is supplied from the water reception tray 4 to the humidification filter 31.

In this case, the water stored in the water reception tray is absorbed into the humidification filter 31 and is sucked up from the peripheral portion to the central portion thereof. When the holding frame 30 continuously rotates in the circumferential direction, the peripheral portion of the humidification filter 31 is continuously immersed in the circumferential direction to absorb water and the absorbed water rotatably moves to rise up. From the above result, water is effectively spread widely over the whole of the humidification filter 31. In other words, the humidification filter 31 rotates, such that the absorption of water of the humidification filter 31 may be facilitated.

Meanwhile, as described above, a flow of air from the rear side to the front side is generated in the suction chamber 12 by the driving of the fan motor 21. The air is introduced into the holding frame 30 via the rear opening of the holding frame 30 and passes from the rear side to the front side of the humidification filter 31 which is housed and held in the holding frame 30. The air passing through the humidification filter 31 contacts the water absorbed into the humidification filter 31, such that the air becomes moist air containing vaporization moisture and is derived to the outside of the holding frame 30 via the front opening of the holding frame 30.

In this regard, according to the present embodiment, the humidification filter 31 is immersed at all times. That is, the humidification filter 31 is supplied with water at all times. Accordingly, even when the humidification device 7 is operated in the cleaning operation mode, air is slightly humidified. Therefore, as described in, for example, Japanese Patent Application Laid-Open No. 2009-24959, the humidification filter 31 may be configured so that the absorption of water into the humidification filter 31 is not carried out during the operation in the cleaning operation mode.

The control unit 70 illustrated in FIG. 3 controls the rotation number of the fan motor 21 to control the air blowing quantity of the blower fan 2. When the rotation number of the fan motor 21 is high, the air blowing quantity of the blower fan 2 is increased, thereby the power consumption of the fan motor 21 is increased. Meanwhile, when the rotation number of the fan motor 21 is low, the air blowing quantity of the blower fan 2 is decreased, thereby the power consumption of the fan motor 21 is decreased. According to the present embodiment, as the rotation number of the fan motor 21, the rotation number R1, the rotation number R2, the rotation number R3, and the rotation number R4 ($0 < R1 < R2 < R3 < R4$) are used. The rotation number R1, the rotation number R2, the rotation number R3, and the rotation number R4 are, for example, 500 rpm, 600, rpm, 700 rpm, and 1000 rpm. In this case, the air blowing quantity of the blower fan 2 is 1.1 $m^3$/min, 1.4 $m^3$/min, 1.8 $m^3$/min, and 3.0 $m^3$/min. Hereinafter, these air blowing quantities are referred to as "small", "medium", "large", and "maximum".

The humidification device 7 has an automatic air volume mode in which the air blowing quantity of the blower fan 2 is automatically set and a manual air volume mode in which a user may manually set the air blowing quantity of the blower fan 2.

In the automatic air volume mode, the air blowing quantity of the blower fan 2 is set on the basis of the detection pollution level of the dust sensor 72. In this case, as the detection pollution level of the dust sensor 72 is increased, the control unit 70 increases the rotation number of the fan motor 21 so as to increase the air blowing quantity of the blower fan 2. As a result, a large amount of air passes through the deodorizing filter 17 and the dust collection filter 18, such that the air cleaning efficiency may be improved. Meanwhile, as the pollution level is decreased, the control unit 70 decreases the rotation number of the fan motor 21, so as to decrease the air blowing quantity of the blower fan 2. As a result, power conserving may be facilitated.

In the manual air volume mode, the user operates the air volume button 734, such that any one of the air blowing quantities "small", "medium", "large", and "maximum" may be set in the humidification device 7. In this case, the rotation number of the fan motor 21 is fixedly set depending on the set air blowing quantity.

After being applied with power, the humidification device 7 starts the operation in the automatic air volume mode when the air cleaning button 731 or the humidification button 732 is operated. When the air volume button 734 is operated during operation, the humidification device 7 is switched from the automatic air volume mode to the air blowing quantity "maximum" (rotation number R4) of the manual air volume mode. Next, each time the air volume button 734 is operated during operation, the humidification device 7 is switched to an order of the air blowing quantity "large" (rotation number R3), the air blowing quantity "medium" (rotation number R2), and the air blowing quantity "small" (rotation number R1) and then is switched to the automatic air volume mode.

In the humidification operation mode, the control unit 70 continuously drives the fan motor 21. Therefore, the fan motor 21 continuously rotates. In this case, the blower fan 2 continuously blows air.

Further, in the humidification operation mode, the control unit 70 continuously drives or intermittently drives the driving motor 53 when the humidity detected by the humidity sensor 71 is the predetermined humidity or less. Therefore, when the humidity detected by the humidity sensor 71 is the predetermined humidity or less, the driving motor 53 continuously or intermittently rotates, and thus the humidification filter unit 3 continuously or intermittently rotates. However, in the humidification operation mode, the control unit 70 does not drive the driving motor 53 when the humidity detected by the humidity sensor 71 exceeds the predetermined humidity. Therefore, when the humidity detected by the humidity sensor 71 exceeds the predetermined humidity, the driving motor 53 does not rotate, and thus the humidification filter unit 3 does not rotate.

Since the rotation of the humidification filter unit 3 facilitates the absorption of water into the humidification filter 31, the absorption of water into the humidification filter 31 is more facilitated in the case in which the humidification filter unit 3 continuously rotates than in the case in which the humidification filter unit 3 intermittently rotates. Further, the power consumption of the driving motor 53 is larger in the case in which the humidification filter unit 3 continuously rotates than in the case in which the humidification filter unit 3 intermittently rotates.

Therefore, when the humidification filter unit 3 continuously rotates for a long period of time, the amount of water absorption into the humidification filter 31 may be excessive and energy conserving may not be achieved. Therefore, the control unit 70 intermittently rotates the humidification filter unit 3 or appropriately switches between the continuous rotation and the intermittent rotation of the humidification filter unit 3.

Hereinafter, the intermittent rotation of the humidification filter unit 3 will be described.

The state in which the humidification filter unit 3 intermittently rotates means the state in which the rotation of the humidification filter unit 3 and the temporary stop of the humidification filter unit 3 are alternately repeated. Hereinafter, the time when the rotation of the humidification filter unit 3 starts, temporarily stops, and restarts is set to be 1 cycle.

According to the present embodiment, during the 1 cycle, the humidification filter unit 3 rotates once and then temporarily stops as much as the predetermined rotating stop time. The required time of the 1 cycle (hereinafter, referred to as a cycle time) is set depending on the rotation number of the fan motor 21 (in other words, the air blowing quantity of the blower fan 2). In detail, in connection with the rotation number R1, the rotation number R2, the rotation number R3, and the rotation number R4 of the fan motor 21, the cycle time S1, the cycle time S2, the cycle time S3, and the cycle time S4 (0<S4<S3<S2<S1) are allocated to the control unit 70. The cycle time S1, the cycle time S2, the cycle time S3, and the cycle time S4 are, for example, 10 minutes, 8 minutes, 7 minutes, and 5 minutes.

The time taken to once rotate the humidification filter unit 3 is uniquely set depending on the feeding frequency to the driving motor 53. Therefore, according to the present embodiment, the rotation time or the rotation number of the humidification filter unit 3 for each intermittent rotation (in other words, every 1 cycle) is constant independent of the air blowing quantity of the blower fan 2.

Meanwhile, the rotating stop time of the humidification filter unit 3 is as long as the cycle time (that is, as the air blowing quantity of the blower fan 2 is small). The blower fan 2 continuously blows air during the rotating stop time of the humidification filter unit 3.

As the rotating stop time of the humidification filter unit 3 is short, the absorption of water into the humidification filter unit 3 is facilitated. However, when the rotating stop time of the humidification filter unit 3 is short, since the air blowing quantity of the blower fan 2 is large (that is, the air blowing quantity passing through the humidification filter unit 3 is large), the vaporization from the humidification filter unit 3 is facilitated. Therefore, there is no possibility that the amount of water absorption into the humidification filter unit 3 becomes excessive.

Meanwhile, when the rotating stop time of the humidification filter unit 3 is long, since the air blowing quantity of the blower fan 2 is small (that is, the air blowing quantity passing through the humidification filter unit 3 is small), the vaporization from the humidification filter unit 3 becomes suppressed. However, as the rotating stop time of the humidification filter unit 3 is long, the absorption of water into the humidification filter unit 3 becomes suppressed. Therefore, there is no possibility that the amount of water absorption into the humidification filter unit 3 becomes excessive.

Next, the continuous rotation of the humidification filter unit 3 will be described.

When the amount of water absorption into the humidification filter unit 3 is insufficient, it is preferable to sufficiently absorb water into the humidification filter unit 3 by the continuous rotation of the humidification filter unit 3. Even though the amount of water absorption into the humidification filter unit 3 is not sufficient, when the humidification filter unit 3 intermittently rotates, the humidification device 7 may not exert sufficient humidification ability. However, when the humidification filter unit 3 continuously rotates for a long period of time, there is a possibility that the amount of water absorption into the humidification filter unit 3 becomes excessive.

Therefore, when the amount of water absorption into the humidification filter unit 3 is not sufficient, the continuous rotation of the humidification filter unit 3 is carried out only during the time (hereinafter, the sufficient water absorption time) when the humidification filter unit 3 sufficiently absorbs water.

The control unit 70 determines whether the non-humidification time is the predetermined non-humidification time or less to determine whether or not the amount of water absorption into the humidification filter unit 3 is sufficient. The reason is that when the non-humidification time exceeds the predetermined non-humidification time, the humidification filter unit 3 is naturally dried during the non-humidification time or is forcibly dried by the blowing of the blower fan 2.

Further, even when the intermittent rotation of the humidification filter unit 3 is carried out for a predetermined cycle (for example, 20 cycles), the control unit 70 may be configured to determine that the amount of water absorption into the humidification filter unit 3 is not sufficient. The reason is that if the intermittent rotation is carried out for a long period of time, the amount of water absorption into the humidification filter unit 3 is liable to be insufficient.

According to the present embodiment, the sufficient water absorption time is constant (for example, 5 minutes) independent of the air blowing quantity of the blower fan 2.

The control unit 70 counts the elapsed time (hereinafter, referred to as the rotation elapsed time) from the driving start of the driving motor 53. When the rotation elapsed time is the sufficient water absorption time or more, the control unit 70 determines that the humidification filter unit 3 sufficiently absorbs water.

Further, the control unit 70 may be configured to use the rotation number until the humidification filter unit 3 sufficiently absorbs water and the rotation number from the rotation start of the humidification filter unit 3 by being switched between the sufficient water absorption time and the rotation elapsed time. In this case, the case in which the rotation number from the beginning of the rotation is large corresponds to the case in which the rotation elapsed time is long. Meanwhile, the case in which the rotation number from the beginning of the rotation is small corresponds to the case in which the rotation elapsed time is short. Further, the control unit 70 determines that the humidification filter unit 3 sufficiently absorbs water when the rotation number from the beginning of the rotation is the rotation number or more until the humidification filter unit 3 sufficiently absorbs water.

In this regard, to count the rotation number after the rotation starts, for example, as described in Japanese Patent Application Laid-Open No. 2009-24959, the humidification device 7 may be configured to include a magnet which is fixed to the outer peripheral portion of the humidification filter unit 3 and a lead switch which is fixed to an outer surface of a side wall of the water reception tray 4 and turned on when the magnet approaches the lead switch and turned off when the magnet is spaced apart therefrom. In this case, the control unit 70 may count the frequency of the lead switch which is switched from the turn off to turn on.

Figure 6:
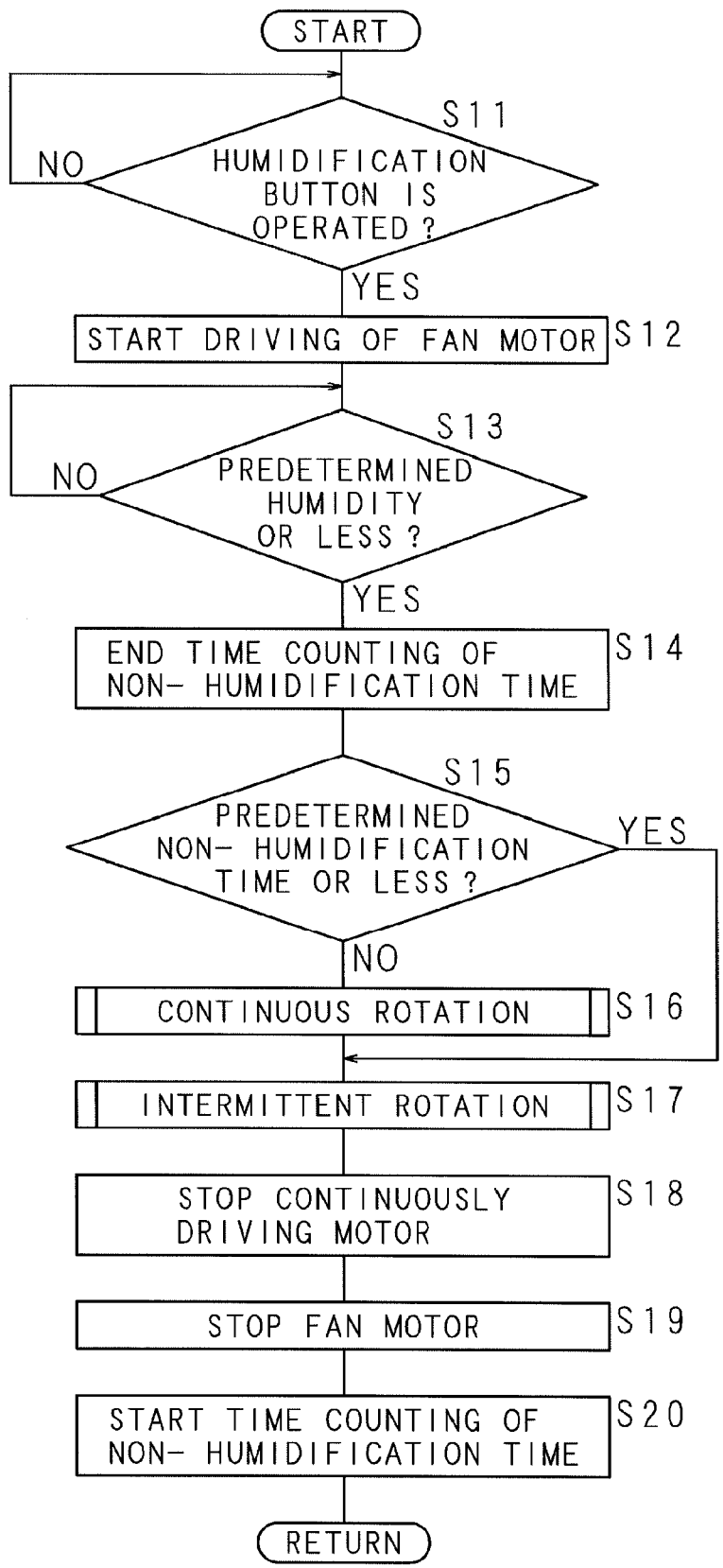
FIG. 6 is a flow chart illustrating a sequence of humidification operation processing executed by the humidification device according to embodiment 1 of the present invention.

FIG. 6 is a flow chart illustrating a sequence of the humidification operation processing executed by the humidification device 7. Hereinafter, the description of the case in which the air cleaning button 731 is operated will be omitted.

The control unit 70 determines whether or not the humidification button 732 is operated (S11) and when it is determined that the humidification button 732 is not operated (NO in S11), the processing of S11 is executed again.

When the humidification button 732 is operated (YES in S11), the control unit 70 starts the driving of the fan motor 21 to start the operation in the humidification operation mode (S12). In S12, the control unit 70 controls the rotation number of the fan motor 21 so that the rotation number of the fan motor 21 is equal to, for example, the rotation number when the electric fan motor 21 is driven at the last time. However, in S12 which is immediately after the humidification device 7 is applied with power, the control unit 70 sets the rotation number of the fan motor 21 to a rotation number of default. After the execution of the processing of S12 ends, although not illustrated, the control unit 70 resets the rotation number of the fan motor 21 depending on the operation of the air volume button 734 or the detection pollution level of the dust sensor.

Next, the control unit 70 determines whether or not the humidity detected by the humidity sensor 71 is the predetermined humidity or less (S13).

When the humidity detected by the humidity sensor 71 exceeds the predetermined humidity (NO in S13), the control unit 70 executes the processing of S13 again unless the stop button 733 is not operated. Although not illustrated, when the stop button 733 is operated prior to executing the processing of S13 again, the control unit 70 executes the processing of S19 to be described below and then returns the processing to S11.

When the humidity detected by the humidity sensor 71 is the predetermined humidity or less (YES in S13), the control unit 70 ends the time counting of the non-humidification time (S14). Further, the control unit 70 determines whether or not the non-humidification time ending the time counting in S14 is the predetermined non-humidification time or less (S15). However, for example, immediately after the humidification device 7 is applied with power, in the case of YES in S13, when the time counting of the non-humidification time is not yet carried out (that is, when the processing of S20 is not yet carried out), the control unit 70 does not execute the processing of S14 and NO may be determined in S15.

When the non-humidification time counted in S14 exceeds the predetermined on-humidification time (NO in S15), the control unit 70 executes the continuous rotation processing (see FIG. 7 to be described below) so as to continuously rotate the humidification filter unit 3 (S16). Further, in S16, after the continuous rotation processing ends or the non-humidification time counted in S14 is the predetermined non-humidification time or less (YES in S15), the control unit 70 executes the intermittent rotation processing (see FIG. 8 to be described below) so as to intermittently rotate the humidification filter unit 3 (S17).

Figure 7:
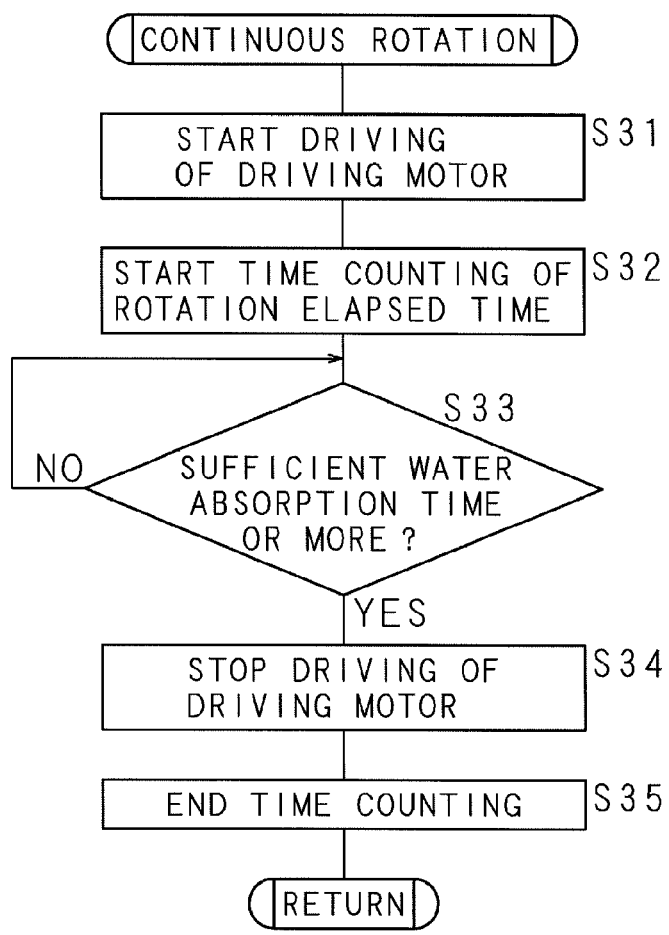
FIG. 7 is a flow chart illustrating the details of a sequence of continuous rotation processing executed by the humidification device according to embodiment 1 of the present invention.

FIG. 7 is a flow chart illustrating the details of a sequence of the continuous rotation processing executed by the humidification device 7.

The control unit 70 starts the driving of the driving motor 53 (S31). Until YES is determined in S33 to be described below after the processing of S31 ends, the control unit 70 repeatedly executes the processing of once stopping the driving of the driving motor 53 when the humidity detected by the humidity sensor 71 exceeds the predetermined humidity and then restarting the driving of the driving motor 53 when the humidity detected by the humidity sensor 71 is the predetermined humidity or more (not illustrated).

In addition, after the processing of S31 ends, the control unit 70 starts the time counting of the rotation elapsed time (S32).

Further, the control unit 70 determines whether or not the rotation elapsed time is the sufficient water absorption time or more (S33).

When the rotation elapsed time is less than the sufficient water absorption time (NO in S33), the control unit 70 executes the processing of S33 again unless the stop button 733 is not operated. Although not illustrated, when the stop button 733 is operated prior to executing the processing of S33 again, the control unit 70 ends the time counting of the rotation elapsed time and then moves the processing to S18 to be described below.

When the rotation elapsed time is the sufficient water absorption time or more (YES in S33), the control unit 70 stops the driving of the driving motor 53 (S34) and ends the time counting of the rotation elapsed time (S35). Next, the control unit 70 ends the continuous rotation processing and returns the processing to the humidification operation processing illustrated in FIG. 6.

Figure 8:
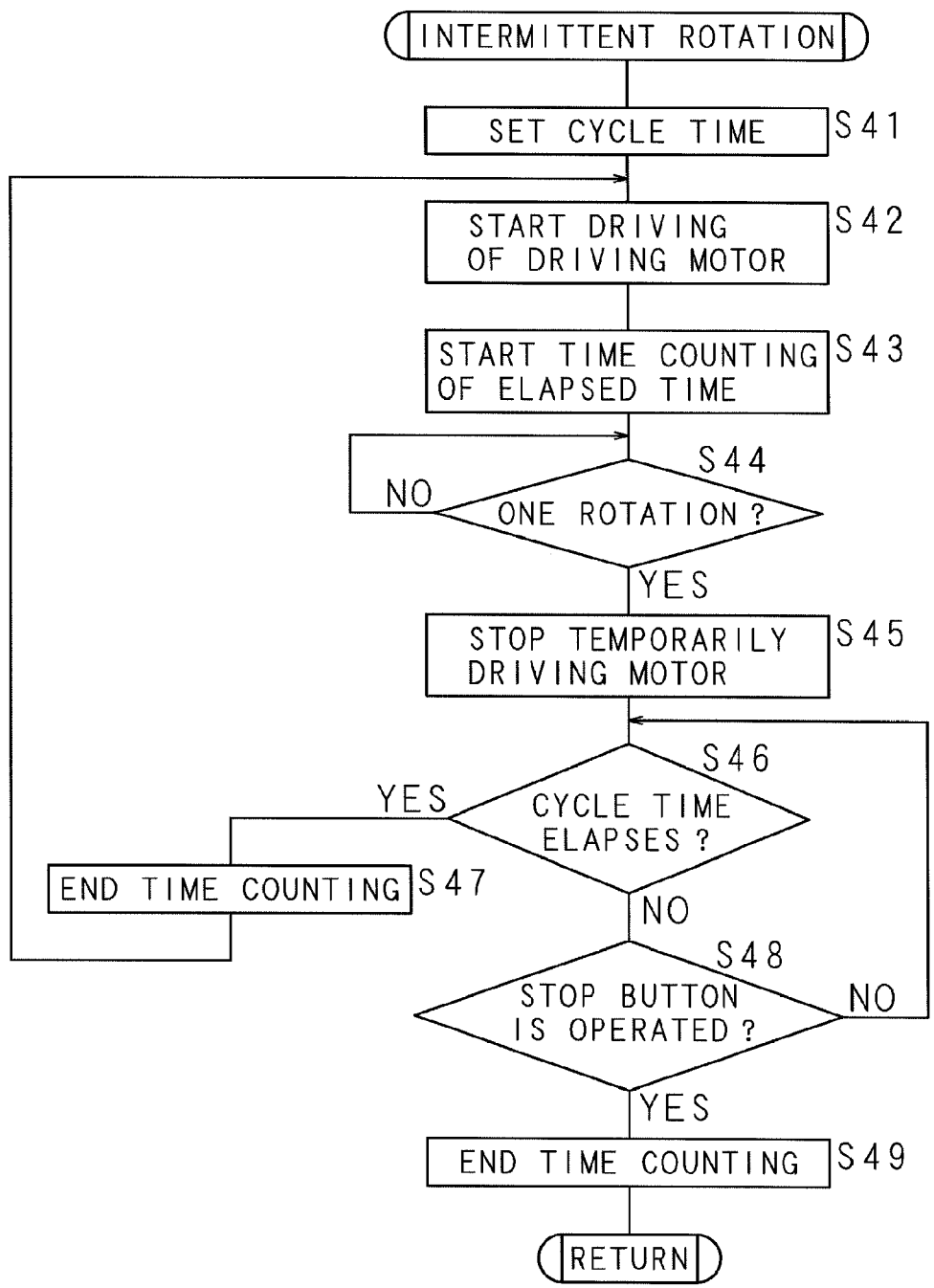
FIG. 8 is a flow chart illustrating the details of a sequence of intermittent rotation processing executed by the humidification device according to embodiment 1 of the present invention.

FIG. 8 is a flow chart illustrating the details of a sequence of the intermittent rotation processing executed by the humidification device 7.

The control unit 70 sets the cycle time depending on the current rotation number of the fan motor 21 (S41). After the cycle time is set in S41, the control unit 70 resets the cycle time each time the rotation number of the fan motor 21 is changed (not illustrated).

Next, the control unit 70 starts the driving of the driving motor 53 (S42) so as to start the intermittent rotation corresponding to the 1 cycle of the humidification filter unit 3 (S43), and then starts the time counting of the elapsed time.

After the processing of the S43 ends, the control unit 70 determines whether or not the humidification filter unit 3 rotates once (S44). In S44, the control unit determines, for example, whether or not the time (for example, about 70 seconds when the feeding frequency to the driving motor 53 is 60 Hz) corresponding to one rotation of the humidification filter unit 3 from the beginning of the driving of the driving motor 53 in S42 elapses.

When the humidification filter unit 3 has not yet rotated once (NO in S44), the control unit 70 executes the processing of S44 again.

When the humidification filter unit 3 rotates once (YES in S44), the control unit 70 temporarily stops the driving of the driving motor 53 (S45).

Next, the control unit 70 determines whether or not the cycle time from the beginning of the time counting in S43 elapses (S46).

When the cycle time elapses (YES in S46), since the intermittent rotation corresponding to 1 cycle of the humidification filter unit 3 ends, the control unit 70 ends the time counting of the elapsed time (S47) and returns the processing to S42, so as to start the intermittent rotation corresponding to the subsequent 1 cycle.

When the cycle time has not yet elapsed (NO in S46), the control unit 70 determines whether or not the stop button 733 is operated (S48).

When the stop button 733 is not yet operated (NO in S48), the control unit 70 returns the processing to S46.

When the stop button 733 is operated (YES in S48), the control unit 70 ends the time counting of the elapsed time (S49) and ends the intermittent rotation processing and returns the processing to the humidification operation processing illustrated in FIG. 6.

However, until YES is determined in S48 after the processing of S43 illustrated in FIG. 8 ends, the control unit 70 executes the processing of S45 and S47 when the humidity detected by the humidity sensor 71 exceeds the predetermined humidity and waits for until the humidity detected by the humidity sensor 71 is the predetermined humidity or more or the stop button 733 is operated. In this case, when the humidity detected by the humidity sensor 71 is the predetermined humidity or more, the control unit 70 returns the processing to S42. Meanwhile, when the stop button 733 is operated, the control unit 70 ends the intermittent rotation processing and returns the processing to the humidification operation processing illustrated in FIG. 6.

In S17, after the intermittent rotation processing ends, the control unit 70 continuously stops the driving of the driving motor 53 (S18) and stops the driving of the fan motor 21 so as to end the operation in the humidification operation mode (S19). Finally, the control unit 70 starts the time counting of the non-humidification time (S20) and returns the processing to S11.

Next, in comparison to the conventional humidification device, the usefulness of the humidification device 7 will be described.

Figure 9:
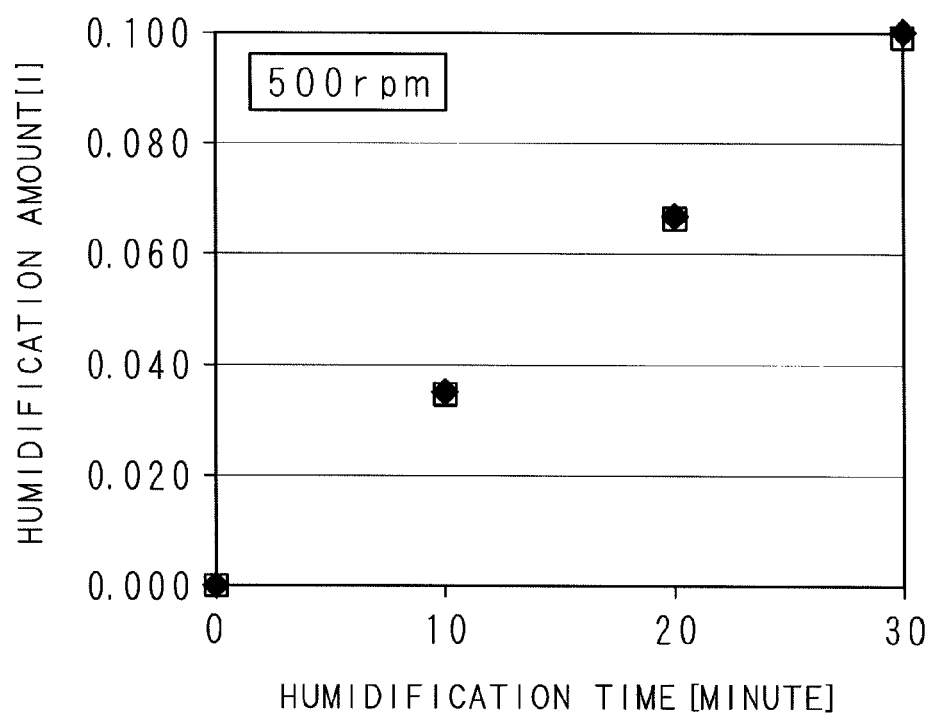
FIG. 9 is a characteristic diagram illustrating a relationship between a humidification time and a humidification amount based on a humidification operation (500 rpm) of the humidification device according to embodiment 1 of the present invention.

FIGS. 9 and 10 are characteristic diagrams illustrating a relationship between the humidification time and the humidification amount by the humidification operation of the humidification device 7, respectively. FIG. 9 illustrates the measurement result when the rotation number of the fan motor 21 is 500 rpm, and FIG. 10 illustrates the measurement result when it is 1000 rpm.

In FIGS. 9 and 10, each horizontal axis represents the humidification time "minute" and each vertical axis represents the humidification amount "1". Further, a black diamond plot (♦) represents the measurement result associated with the humidification device 7 and a white squared plot (☐) represents the measurement result associated with a conventional humidification device.

Herein, the humidification time is the time when the humidification filter unit 3 continuously rotates only for 5 minutes and then starts the count, during the driving of the fan motor 21. After the humidification time is 0 minutes, the humidification filter unit 3 of the humidification device 7 intermittently rotates, while the humidification filter unit of the conventional humidification device continuously rotates.

Further, the humidification amount is a volume of moisture which is sent to the outside the device from the humidification device 7 or the conventional humidification device.

Referring to FIGS. 9 and 10, it can be seen that the humidification amount of the humidification device 7 is comparable to that of the humidification amount of the conventional humidification device, independent of the rotation number of the fan motor 21 (that is, the air blowing quantity of the blower fan 2).

Meanwhile, when the rotation number is 500 rpm illustrated in FIG. 9, although not illustrated, the power consumption of the conventional humidification device is 5.2 Wh and the power consumption of the humidification device 7 is 3.3 Wh. That is, the humidification device 7 achieves a power conserving effect of about 36%.

Further, when the rotation number is 1000 rpm illustrated in FIG. 10, although not illustrated, the conventional power consumption of the humidification device is 16.1 Wh and the power consumption of the humidification device 7 is 14.5 Wh. That is, the humidification device 7 achieves a power conserving effect of about 10%.

From the above description, it can be seen that the humidification device 7 may conserve the energy by the intermittent rotation of the humidification filter unit 3 without deteriorating the humidification ability.

Hereinafter, the humidification device 7 and the conventional humidification device have feeding frequencies to the driving motor 53 of 60 Hz, respectively.

Next, the setting of the sufficient water absorption time by a manufacturer of the humidification device 7 will be described.

Figure 12:
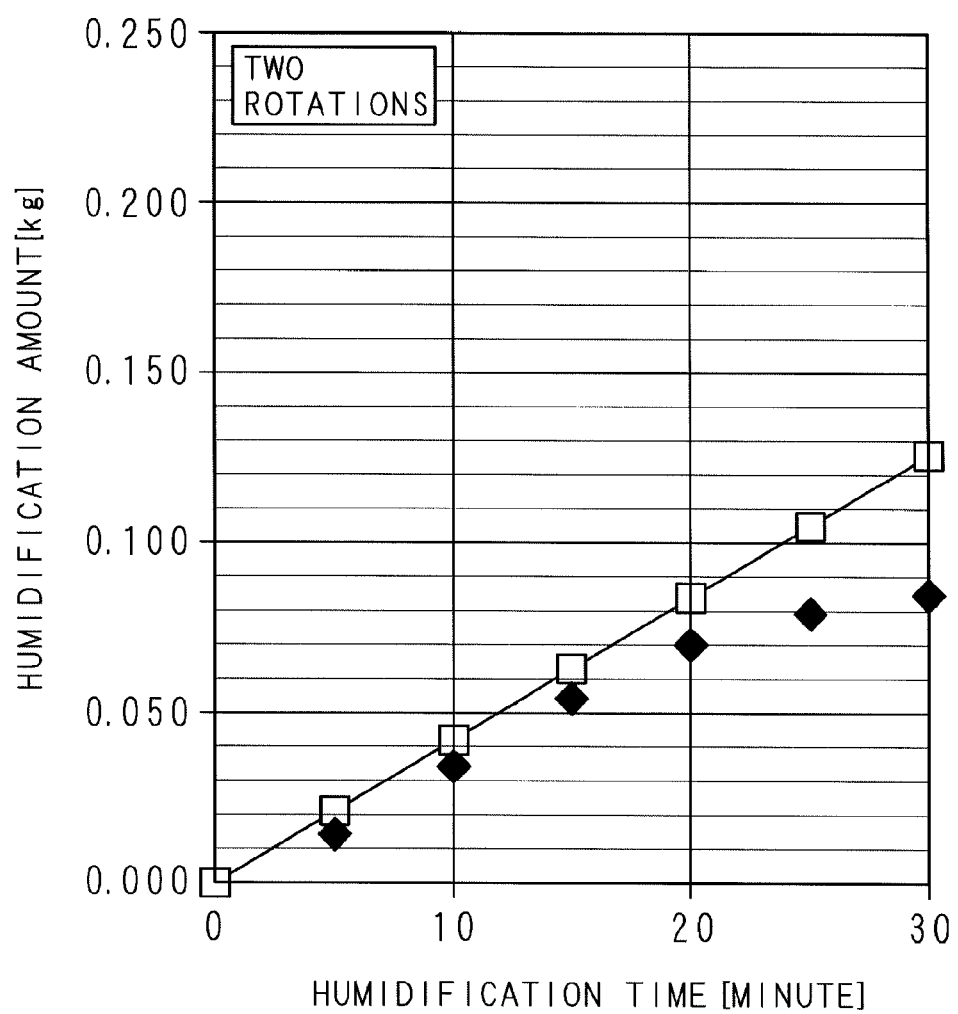
FIG. 12 is a characteristic diagram illustrating the relationship between the humidification time and the humidification amount based on a humidification operation (continuous twice rotation) of the humidification device according to embodiment 1 of the present invention.
Figure 13:
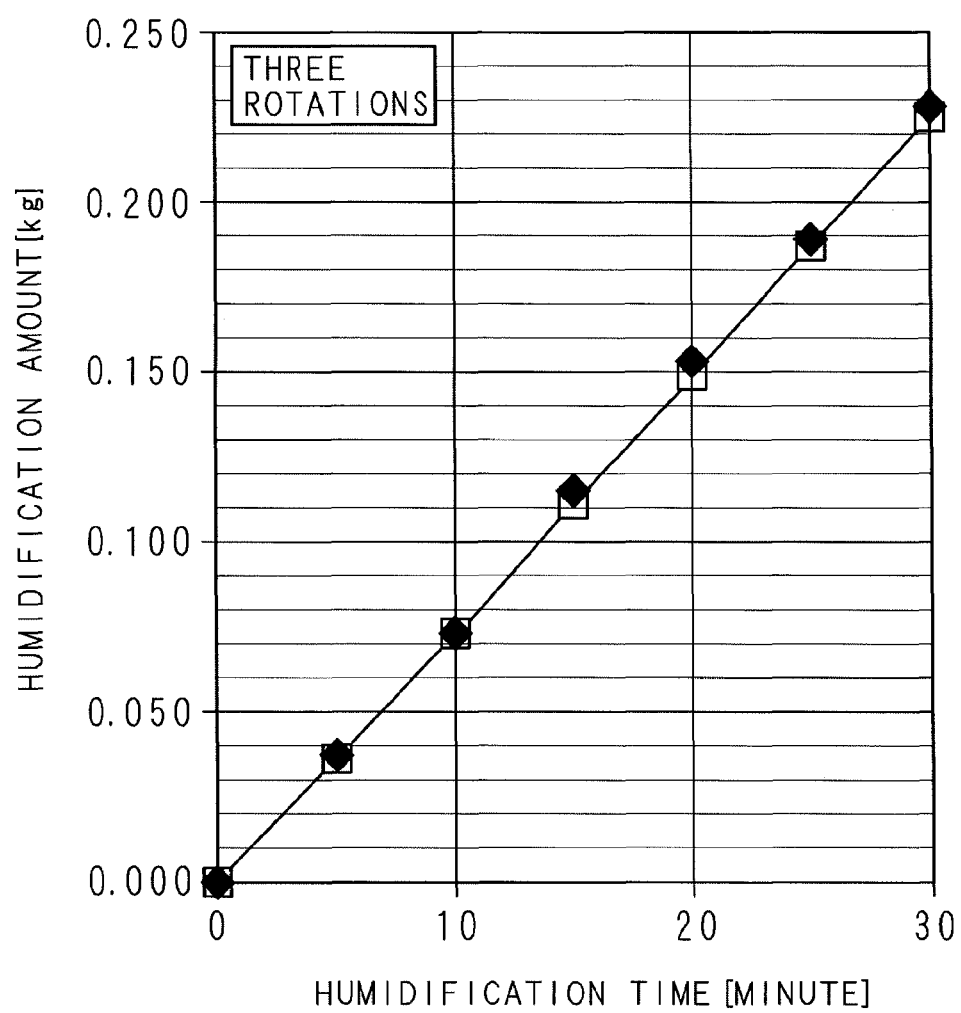
FIG. 13 is a characteristic diagram illustrating the relationship between the humidification time and the humidification amount based on a humidification operation (continuous three times rotation) of the humidification device according to embodiment 1 of the present invention.

FIGS. 11 to 13 are characteristic diagrams illustrating a relationship between the humidification time and the humidification amount by the humidification operation of the humidification device 7, respectively.

In FIGS. 11 to 13, the meanings of each horizontal axis, each vertical axis, and each plot are substantially the same as those of FIG. 9 or 10.

However, the humidification amount is a weight of moisture "kg".

Further, a solid line is an approximately straight line of the measurement result associated with the conventional humidification device.

Further, in FIG. 11 (FIGS. 12, and 13), the humidification time is the time taken to once (two times and three times) rotate the humidification filter unit 3 and then start the time counting during the driving of the fan motor 21. In other words, the humidification time in FIG. 11 (FIGS. 12, and 13) is the time taken to continuously rotate the humidification filter unit 3 for about 70 seconds (about 140 seconds, and about 210 seconds) and then start the time counting.

Furthermore, the humidification amount is measured under the environment in which temperature is about 20° C. and humidity is from about 29% to about 31%.

In FIG. 11, in the humidification device 7 and the conventional humidification device, the fan motor 21 is driven at 500 rpm. Similarly, in FIG. 12 (FIG. 13), in the humidification device 7 and the conventional humidification device, the fan motor 21 is driven at 600 rpm (1000 rpm).

In this regard, at the time when the humidification time is 0 minutes, the amount of water absorption into the humidification filter unit 3 is larger in an order of FIGS. 13, 12, and 11. However, since the air blowing quantity of the blower fan 2 is larger in an order of FIGS. 13, 12, and 11, the humidification filter unit 3 is liable to become dried in an order of FIGS. 13, 12, and 11.

Referring to FIGS. 11 and 12, it can be seen that the humidification amount of the humidification device 7 is smaller than that of the conventional humidification device and a difference therebetween is increased with the passage of the humidification time. The reason is that under the condition of FIGS. 11 and 12, as the time when the humidification filter unit 3 continuously rotates is short, the intermittent rotation starts in the state in which the humidification filter unit 3 does not sufficiently absorb water (that is, the amount of water absorption into the humidification filter unit 3 is not sufficient at the time when the humidification time is 0 minutes).

Meanwhile, referring to FIG. 13, it can be seen that despite under the condition in which the humidification filter unit 3 is most liable to be dried, the humidification amount of the humidification device 7 is approximately comparable to that of the conventional humidification device. The reason is that as the time when the humidification filter unit 3 continuously rotates is long, the humidification filter unit 3 sufficiently absorbs water at the time when the humidification time is 0 minutes.

From the above description, it may be preferable that the sufficient water absorption time is the time (that is, about 3 minutes 30 seconds) or more corresponding to three times rotation of the humidification filter unit 3. Therefore, a manufacturer may set the sufficient water absorption time to, for example, 5 minutes in consideration of the increase or decrease in the humidification amount depending on the measurement error, the difference in the environment to be humidified, or the like.

Next, the setting of the cycle time by the manufacturer will be described.

Figure 14:
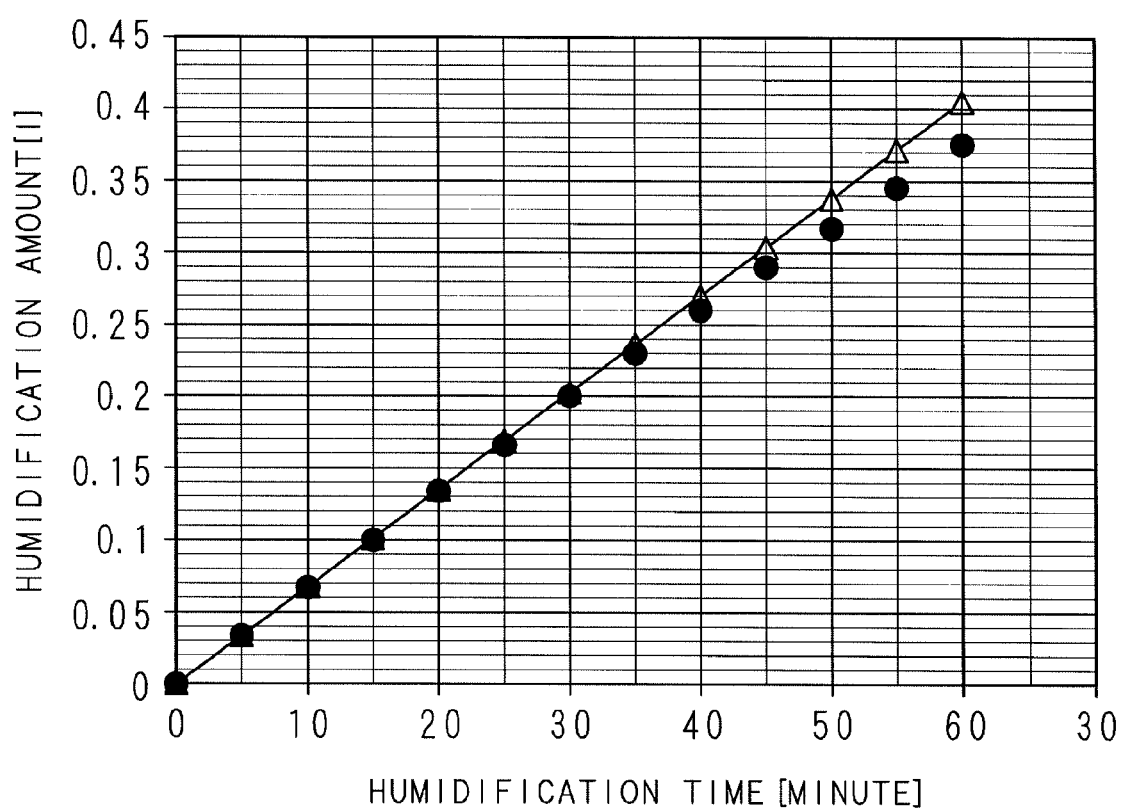
FIG. 14 is a characteristic diagram illustrating the relationship between the humidification time and the humidification amount based on a humidification operation (cycle time of 5 minutes and 10 minutes) of the humidification device according to embodiment 1 of the present invention.

FIG. 14 is a characteristic diagram illustrating a relationship between the humidification time and the humidification amount by the humidification operation of the humidification device 7.

The meanings of the horizontal axis and the vertical axis of FIG. 14 are the same as those of FIG. 9 or 10. A unit of the humidification amount is liter.

Furthermore, the humidification amount is measured under the environment in which temperature is about 21° C. and humidity is about 31%.

In FIG. 14, in the humidification device 7 and the conventional humidification device, the fan motor 21 is driven at 1000 rpm. A black circular plot (●) and a white triangular plot (Δ) represent the measurement result associated with the humidification device 7, respectively. A solid line represents an approximately straight line associated with the conventional humidification device. However, in the humidification device 7 represented by the black circular plot, the cycle time is 5 minutes and in the humidification device 7 represented by the white triangular plot, the cycle time is 10 minutes. That is, in the former case, the humidification filter unit 3 rotates once per 5 minutes and in the latter case, the humidification filter unit 3 rotates once per 10 minutes. Therefore, in the former case, the rotating stop time is about 3 minutes 50 seconds and in the latter case, the rotating stop time is about 8 minutes 50 seconds.

Referring to FIG. 14, it can be seen that when the cycle time is 10 minutes, the humidification amount of the humidification device 7 is smaller than that of the conventional humidification device and a difference therebetween is increased with the passage of the humidification time. The reason is that the longer the cycle time is, the longer the rotating stop time is.

Meanwhile, it can be seen that when the cycle time is 5 minutes, the humidification amount of the humidification device 7 is approximately equal to that of the conventional humidification device.

A manufacturer carries out a humidification experiment in which the cycle time and eventually the rotating stop time are changed, wherein each time the rotation number of the fan motor 21 is different (for example, for each of the rotation numbers R1 to R4). Further, a manufacturer may set the humidification amount of the humidification device 7 to be approximately equal to the humidification amount of the conventional humidification device, and the longest cycle time to the cycle time to be associated with the corresponding rotation number. When the cycle time is set as described above, it is possible to minimize the power consumption without decreasing the humidification ability.

In the humidification device 7 as described above, the blower fan 2, the humidification filter unit 3, the holding frame 30, the humidification filter 31, the water reception tray 4, the transmission mechanism 5, and the control unit 70 serve as the blower, the filter unit, the holding body, the filter body, the water storage unit, the rotation driving mechanism, and the control unit according to the embodiment of the present invention.

Further, the control unit 70 executing the processing of S31 illustrated in FIG. 7 serves as the continuous control means according to the embodiment of the present invention and the control unit 70 executing the processing of S33 serves as the determination means according to the embodiment of the present invention.

Further, the control unit 70 repeatedly executing the processing of S42 to S47 illustrated in FIG. 8 serves as the intermittent control means according to the embodiment of the present invention.

Although the humidification device 7 is configured to rotate the humidification filter unit 3, a humidification device according to the embodiment of the present invention may be configured to rotate the water storage unit. The humidification device includes a blower fan, a humidification filter unit, a water wheel as the water storage unit, a transmission mechanism rotating the water wheel, a control unit, and a water reception tray for supplying water to the water wheel. The control unit controls the operation of the transmission mechanism to intermittently or continuously rotate the water wheel. The rotating water wheel is supplied with water from the water reception tray and carries the pumped-up water to the humidification filter unit. That is, the humidification device rotates the water wheel to supply water to the humidification filter unit. In this case, the humidification filter unit may be a non-rotating type. However, when storing water dropped from the humidification filter unit and dipping the humidification filter unit into the stored water, the humidification filter unit may be a rotating type like the humidification filter unit 3.

Further, the humidification device 7 may be configured to vary the rotation number of the driving motor 53 by, for example, an inverter control.

Embodiment 2

The hardware configuration of the humidification device 7 according to the present embodiment is the same as that of the humidification device 7 according to embodiment 1. Hereinafter, a difference from embodiment 1 will be described, and other corresponding parts with embodiment 1 have the same reference numbers, and a detailed description thereof will be omitted.

According to the present embodiment, the sufficient water absorption time is set depending on the rotation number of the fan motor 21 (in other words, the air blowing quantity of the blower fan 2). In detail, in connection with the rotation number R1, the rotation number R2, the rotation number R3, and the rotation number R4 of the fan motor 21, the sufficient water absorption time T1, the sufficient water absorption time T2, the sufficient water absorption time T3, and the sufficient water absorption time T4 ($0<T1<T2<T3<T4$) are allocated to the control unit 70.

In this case, in the continuous rotation processing illustrated in FIG. 7, the control unit 70 executes the processing of setting the sufficient water absorption time depending on the current rotation number of the fan motor 21 and then executes the processing of S31. However, after the sufficient water absorption time is set, the control unit 70 resets the sufficient water absorption time each time the rotation number of the fan motor 21 is changed.

As described above, when the rotation number of the fan motor 21 is high, that is, when the air blowing quantity of the blower fan 2 is large, the humidification device 7 increases the sufficient water absorption time. By this, when the humidification filter unit 3 is liable to be dried, it is possible to control the insufficient absorption of water or the excessive absorption of water into the humidification filter unit 3. Meanwhile, when the rotation number of the fan motor 21 is low, that is, when the air blowing quantity of the blower fan 2 is small, the humidification device 7 reduces the sufficient water absorption time. By this, when the humidification filter unit 3 is hardly dried, it is possible to control the insufficient absorption of water or the excessive absorption of water into the humidification filter unit 3. As a result, it is possible to achieve the appropriate humidification ability depending on the air blowing quantity of the blower fan 2 while conserving the energy.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

As long as the humidification device 7 has the effect of the present invention, the humidification device 7 may include components which are not disclosed in embodiments 1 and 2.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

The invention claimed is:

1. A humidification device, comprising:
a water storage unit configured to store water;
a filter unit which has water absorption properties and air permeability and is supplied with water from the water storage unit;
a blower configured to send air passing through the filter unit to an outside of a device;
a rotation driving mechanism configured to rotate the water storage unit or the filter unit to facilitate the supply of water to the filter unit or the absorption of supplied water into the filter unit; and
a control unit configured to control an operation of the rotation driving mechanism,
wherein the control unit includes:
an intermittent control section configured to intermittently rotate the water storage unit or the filter unit;
a continuous control section configured to continuously rotate the water storage unit or the filter unit; and
a determination section configured to determine whether or not the water storage unit or the filter unit rotates for a predetermined time or by a predetermined number from the beginning of the continuous rotation, when the water storage unit or the filter unit continuously rotates, this determination is made when a non-humidification time is a predetermined non-humidification time or less to determine whether an amount of water absorption in the filter unit is sufficient,
wherein when the determination section determines that the amount of water absorption is sufficient, the control unit switches from a control by the continuous control section to a control by the intermittent control section.

2. The humidification device according to claim 1, further comprising:
a time counting unit configured to count the time taken from stopping of a humidification operation to restarting thereof,
wherein when the time counted by the time counting unit is longer than a predetermined time, the control unit starts the control by the continuous control section at the time of restarting the humidification operation, then the control unit carries out the determination using the determination section, and the control unit switches the control by the continuous control section to the control by the intermittent control section when the determination section determines that the water storage unit or the filter unit rotates for the predetermined time or by the predetermined number, and
when the time counted by the time counting unit is the predetermined time or less, the control unit starts the control by the intermittent control section at the time of restarting the humidification operation.

3. The humidification device according to claim 1, wherein the blower is configured to change an air blowing quantity, and
the predetermined time or the predetermined number is set depending on the air blowing quantity of the blower.

4. The humidification device according to claim 1, wherein the filter unit is formed in a disk shape, the filter unit includes a filter body having water absorption properties and air permeability and a holding body holding the filter body, the filter unit is disposed in a vertical attitude, and a portion of the filter unit in the circumferential direction thereof is immersed into the water storage unit,
the rotation driving mechanism rotates the filter unit in the circumferential direction, and
the blower sends air so as to pass the air through the filter unit in a direction intersecting the filter unit.

5. A humidification device, comprising:
a water storage unit configured to store water;
a filter unit which has water absorption properties and air permeability and is supplied with water from the water storage unit;
a blower configured to send air passing through the filter unit to an outside of a device;
a rotation driving mechanism configured to rotate the water storage unit or the filter unit to facilitate the supply of water to the filter unit or the absorption of supplied water into the filter unit; and
a control unit configured to control an operation of the rotation driving mechanism,
wherein the control unit includes an intermittent control section configured to intermittently rotate the water storage unit or the filter unit,
wherein the blower is configured to change an air blowing quantity, and
a rotating stop time of the water storage unit or the filter unit for each intermittent rotation is set depending on the air blowing quantity of the blower so that the smaller the air blowing quantity of the blower is, the longer the rotating stop time is.

6. The humidification device according to claim 5, wherein the rotation time or the rotation number of the water storage unit or the filter unit for each intermittent rotation is constant.

* * * * *